US007260548B1

(12) United States Patent
Allsup

(10) Patent No.: US 7,260,548 B1
(45) Date of Patent: Aug. 21, 2007

(54) LONG TERM DISABILITY OVERPAYMENT RECOVERY SERVICE WITH POST AWARD SERVICE AND SAVINGS PROGRAM AND FINANCIAL ASSISTANCE

(75) Inventor: James F. Allsup, 300 Allsup Pl., Belleville, IL (US) 62223-8626

(73) Assignee: James F. Allsup, Belleville, IL (US)

( * ) Notice: Subject to any disclaimer, the term of this patent is extended or adjusted under 35 U.S.C. 154(b) by 1478 days.

(21) Appl. No.: 09/629,323

(22) Filed: Jul. 31, 2000

Related U.S. Application Data

(60) Provisional application No. 60/189,551, filed on Mar. 15, 2000.

(51) Int. Cl.
*G06Q 40/00* (2006.01)

(52) U.S. Cl. .......................................................... 705/4
(58) Field of Classification Search .................... 705/4, 705/39, 30, 40
See application file for complete search history.

(56) References Cited

U.S. PATENT DOCUMENTS

| 4,491,725 A * | 1/1985 | Pritchard ........................ 705/2 |
| 4,858,121 A * | 8/1989 | Barber et al. ................... 705/2 |
| 5,301,105 A * | 4/1994 | Cummings, Jr. ................ 705/2 |
| 5,727,249 A * | 3/1998 | Pollin ........................... 705/40 |
| 6,208,973 B1 * | 3/2001 | Boyer et al. .................... 705/2 |
| 6,625,582 B2 * | 9/2003 | Richman et al. ............... 705/35 |

FOREIGN PATENT DOCUMENTS

GB           2370892 A   *  7/2002

OTHER PUBLICATIONS

Social Security Disability Consultants, Oct. 29, 1993 pp. 1-5.*
Anonymous. "Injured Workers Were Paid Too Much" Sarasota Herald Tribune, Sarasota Florida, Mar. 28, 1997.*
Web Archive printout: □□ http://webarchive.org/web/19991128152241/http.allsupinc.com/index.html □□ http://webarchive.org/web/2000229231516/www.allsupinc.com/services/corpser.htm □□.*
Runner, Diana, "Changes in unemployment insurance legislation during 1998", Monthly Labor Review, Jan. 1898, v112, n1, p. 59, Dialog accession No. 03897677, file No. 148.*
King, Drew, "Know The Disability Management Benchmarks", National Underwriter Life & Health-Financial Services Edition, v103, n7, p. 16, Feb. 15, 1999.*

(Continued)

*Primary Examiner*—Alexander Kalinowski
(74) *Attorney, Agent, or Firm*—Polster, Lieder, Woodruff & Lucchesi, L.C.

(57) ABSTRACT

A method of recovering overpayment of long-term disability benefits after the receipt of Social Security disability insurance payment, providing post-award services and savings to claimants, and providing financial assistance to disabled claimants. The overpayment recovery service is seamless and provides for automatic recovery of overpayments from the claimant account and increases the percentage collected and reduces collection time over conventional methods. The methods of overpayment recovery post-award services and savings and the financial assistance may be utilized as integrated services.

10 Claims, 12 Drawing Sheets

SEAMLESS OVERPAYMENT RECOVERY SERVICES FLOW CHART
(SEAMLESS ORS)

OTHER PUBLICATIONS

Allsup Inc.'s Overpayment Recovery Service, 1997-1998, 2 pages.*
Social Security Disability Consultants, p. 1-5.
Business Reply Mail Card—*First, the Bad New . . . Now the Good News* Date Unknown.
Brochure—*The Social Security Disability Specialists* 1993.
Brochure—*How To Get Your Social Security Disability Benefits Quickly & Easily* 1995-1996.
Brochure—*Allsup Inc.'s Overpayment Recovery Service* 1995-1996.
Brochure—*Allsup Inc.'s Prescription For Medicare Recovery* 1995-1996.
Printout from Allsup's website—*Allsup's Employer Services* 1996.
Brochure—*Allsup Inc.'s Overpayment Recovery Service* 1997-1998.
Business Reply Card—*Who Says Drop Outs* Date Unknown.
Brochure—*The Third-Party Adminstrator's First Choice In Cost Containment* Date Unknown.
Brochure—*Don't take our word for it when we tell you we're the nation's best Social Security assistance company* 1992.
Brochure—*Social Security Disability Assistance Program* 2000.
Brochure—*Help In Applying for Social Security Disability Benefits Allsup Inc.* 1997.
Web -PASS™ -Post-Award Service & Savings 2000.
Folder including three separate brochures—*Enter A New Dimension Of Social Security Savings* 2000.
Disability Coordination By Allsup Inc. 1999.

* cited by examiner

```
☐ SMARTWARE FOR WINDOWS (NEW VERSION)                        ☐☐☒
WINDOW 1 ═════════════════════════════════════════════ {{<─>}}
ORSDATA5.VW          ┌─────────────────────┐         07/26/2000
SCREEN 1             │ SSR CASE ORS DATA FILE │         02:42:20P
                     └─────────────────────┘
 CLIENT CO  :
 SITE ID    :
 EMPLOYER   :
 SSN        :              DECEASED/NO MAIL:
 CLAIMANT   :
 ADDRESS 1  :
 ADDRESS 2  :
 CITY/ST/ZIP:
 CONSULTANT :
 ASSISTANT  :
 LEVEL/STS  :
 CLAIM NBR. :
 CLMT ELCTD :
 AOD        :
                           PgDn FOR CLIENT DATA
◁                                                                ▷
MENU: DATA FILE ORDER PRINT TOOLS WINDOW HELP REMEMBER QUIT
VIEW: ORSDATA5.VW WINDOW 1                              REC: 1 (1)
LOAD CREATE MODIFY SAVE UNLOAD ACTIVATE DISPLAY-ACTIVE IMPORT EXPORT PASSWORD
```

FIG. 4

```
☐ SMARTWARE FOR WINDOWS (NEW VERSION)                        ☐☐☒
WINDOW 1 ═════════════════════════════════════════════ {{<─>}}
ORSDATA5.VW          ┌─────────────────────┐         07/26/2000
SCREEN 2             │ SSR CASE ORS DATA FILE │         02:42:20P
                     └─────────────────────┘
 INITIAL FORMS TO CLMT :        DID ALLSUP DO INITIAL APP:
 INITIAL FORMS FU      :        INITIAL APP STATUS        :
 INITIAL FORMS TO SSA  :        RECON FORMS FU            :

ORS STATUS            :
 ORS COMMENT           :
 NQ REASON             :                                 ALTF5 ME
 CURRENT ORS STAGE     :  ┌─────────┐ TYPE:    ASSIGNED 2:
 ORS FU DATE           :  │         │ TYPE:    LEAD ASSNG:
 LEAD ORS FU DATE      :  PENDING     DIR PAY OPTION AVAIL: Y
 INITIAL REFERRAL STATUS:
 SSA FORM 795          :
                                CLAIMANT INCENTIVE        :
 CALL TRANSITIONED BY REP:
 ORS GROUP             :   PgDn FOR TALK SHEET
◁                                                                ▷
MENU: DATA FILE ORDER PRINT TOOLS WINDOW HELP REMEMBER QUIT
VIEW: ORSDATA5.VW WINDOW 1                              REC: 1 (1)
LOAD CREATE MODIFY SAVE UNLOAD ACTIVATE DISPLAY-ACTIVE IMPORT EXPORT PASSWORD
```

FIG. 5

```
┌────────────────────────────────────────────────────────────────────┐
│ ☐ SMARTWARE FOR WINDOWS (NEW VERSION)                    ─ ☐ ☒    │
├────────────────────────────────────────────────────────────────────┤
│ WINDOW 1 ═══════════════════════════════════════════ {{<─>}}      │
│ ORSDATA5.VW         ┌──────────────────────┐         07/26/2000   │
│ SCREEN 5            │ SSDR CASE ORS DATA FILE│        02:42:20P   │
│                     └──────────────────────┘                       │
│ A. SSDI RETROACTIVE BENEFITS      :  0.00  ACTUAL PAYMENT TYPE :  │
│ C. DEPENDENT RETROACTIVE BENEFITS :         AMTAUTHBYCLIENT  $0.00│
│ D. EXTRA SSDI MONTHLY PAYMENT     :                                │
│ E. TOTAL FUNDS AVAILABLE TO REPAY :  0.00                          │
│ F. GRS OVERPAYMENT AMT DUE CLIENT :                                │
│ G. CLAIMANT INCENTIVE PERCENTAGE  :          %                     │
│ H. CLAIMANT INCENTIVE AMOUNT      :                                │
│ I. NET OVERPAYMENT DUE TO CLIENT  :  0.00                          │
│ J. AMOUNT RECOVERED FROM CLAIMANT :  0.00                          │
│ K. ORS FEE BASIS                  :                                │
│ L. OVERPAYMENT RECOVERY FEE %     :                                │
│ M. ORS FEE                        :          Q. CLAIMS FEE        │
│ N. PERCENTAGE OF OP RECOVERED (J/I): 0.0                           │
│ O. PERCENTAGE OF OP TO REPAY  (J/E): 0.0                           │
│ P. PERCENTAGE OF OP TO RETRO  (J/1): 0.0   PAGE DOWN FOR MORE DATA│
├────────────────────────────────────────────────────────────────────┤
│ MENU: DATA FILE ORDER PRINT TOOLS WINDOW HELP REMEMBER QUIT        │
│ VIEW: ORSDATA5.VW WINDOW 1                              REC: 1 (1)│
│ LOAD CREATE MODIFY SAVE UNLOAD ACTIVATE DISPLAY-ACTIVE IMPORT EXPORT PASSWORD│
└────────────────────────────────────────────────────────────────────┘
```

FIG. 8

```
┌────────────────────────────────────────────────────────────────────┐
│ ☐ SMARTWARE FOR WINDOWS (NEW VERSION)                    ─ ☐ ☒    │
├────────────────────────────────────────────────────────────────────┤
│ WINDOW 1 ═══════════════════════════════════════════ {{<─>}}      │
│ ORSDATA5.VW         ┌──────────────────────┐         07/26/2000   │
│ SCREEN 6            │ ORS DATA PARTIAL PAY │         02:42:20P   │
│                     └──────────────────────┘                       │
│                                                                    │
│   ┌─ PAYMENTS ─────────────────────┐                               │
│   │ PAYMENT AMT │ PAYMENT DA │ P│ B│                               │
│   │             │            │  │  │                               │
│   │             │            │  │  │                               │
│   │             │            │  │  │                               │
│   └─────────────┴────────────┴──┴──┘                               │
│                                                                    │
│                          END OF DATA                               │
├────────────────────────────────────────────────────────────────────┤
│ MENU: DATA FILE ORDER PRINT TOOLS WINDOW HELP REMEMBER QUIT        │
│ VIEW: ORSDATA5.VW WINDOW 1                              REC: 1 (1)│
│ LOAD CREATE MODIFY SAVE UNLOAD ACTIVATE DISPLAY-ACTIVE IMPORT EXPORT PASSWORD│
└────────────────────────────────────────────────────────────────────┘
```

FIG. 9

```
┌─────────────────────────────────────────────────────────────────┐
│ □ SMARTWARE FOR WINDOWS  (NEW VERSION)                  ❑❒❘✕   │
├─────────────────────────────────────────────────────────────────┤
│ WINDOW 1 ═══════════════════════════════════════ {{<─>}}  ▲    │
│                       END OF DATA                                │
│                                                                  │
│    FEE RATE    : 1.0                                            │
│    CLNT LORS   : Y                                              │
│    ORS RATE    :                                                │
│    ORS OART.   : Y                                              │
│    RETRO                                                        │
│    SSI RETRO                                                    │
│    DEP RETRO                                                    │
│    LORS OP AMT       $0.00                                      │
│    AMOUNT      24.74                                            │
│    LORS FEE         $0.00                                       │
│    ORS QUARTER                                                  │
│    PERCENT OF STLMT                                             │
│    ORS AMT DUE CLIENT       0.00                                │
│                                                          ▼      │
│ ◁│                                                         │▷   │
├─────────────────────────────────────────────────────────────────┤
│ MENU:  DATA FILE ORDER PRINT TOOLS WINDOW HELP REMEMBER QUIT    │
│ VIEW:  ORSDATA5.VW WINDOW 1                         REC: 1 (1)  │
│ LOAD CREATE MODIFY SAVE UNLOAD ACTIVATE DISPLAY-ACTIVE IMPORT EXPORT PASSWORD │
└─────────────────────────────────────────────────────────────────┘
```

FIG. 10

LONG TERM DISABILITY OVERPAYMENT RECOVERY SERVICE WITH POST AWARD SERVICE AND SAVINGS PROGRAM AND FINANCIAL ASSISTANCE

CROSS-REFERENCE TO RELATED APPLICATIONS

This application claims priority to provisional patent application Ser. No. 60/189,551, filed Mar. 15, 2000.

BACKGROUND OF THE INVENTION

The invention relates generally to methods of securing disability insurance benefits and, more specifically, to novel methods, generally configured with computer and software technology, of securing Social Security disability insurance benefits, recovering overpayments of disability insurance benefits made to a disabled individual, providing additional services to the disabled individual after securing Social Security disability insurance benefits, and providing financial assistance for the disabled individual during the pendency of their disability insurance claim with the Social Security Administration.

The inventor's core business consists of representing individual claimants before the Social Security Administration (SSA) for purposes of obtaining Social Security disability insurance benefits (SSDI). Traditionally, the inventor's primary customers (clients) are insurance carriers that write long-term disability (LTD) policies and self-insured employers who desire to reduce their long-term disability expense by obtaining SSDI for their policy holders or their individual employees. In connection with the provision of services to his clients, the inventor has developed new business methods to provide such services utilizing sophisticated computer programs, databases and electronic fund retrieval methods.

On average, it takes SSA thirteen months to process a claim for SSDI. Once SSDI is awarded, generally there is a retroactive benefit representing disability payments that should have been paid by the SSA beginning with the sixth full month an individual is off work due to disability. LTD plans are designed to offset the LTD benefit upon the disabled individual's receipt of SSDI. In other words, once SSDI is obtained for a claimant, the LTD is reduced. However, full LTD benefits are paid until the SSDI is awarded. Generally, the disabled employee signs an agreement to repay any overpayment created by the award of retroactive SSDI. A portion of the retroactive SSDI, therefore, is due to the LTD plan as repayment of this overpayment.

For example, a disabled individual is receiving $1,400 per month in LTD. After 18 months, SSA awards disability benefits of $1,000 per month. SSA issues a retroactive check for 12 months of benefits (SSA does not pay during the 5-month waiting period) or $12,000. Based on the plan design the disabled employee's LTD benefit will be reduced by $900 per month, for a net LTD benefit of $500. Since the disabled individual was paid $1,400, he or she would owe the plan $900×12 months, or $10,800.

Additionally, the disabled individual receives a number of financial advantages upon receipt of SSDI:

Increased Monthly Income

Although the initial SSDI may be offset by other disability or retirement benefits the disabled individual already is receiving, the SSDI cost-of-living increases may not. Thus, the combined benefits may increase each year when SSDI cost-of-living increases are paid.

Increased Retirement and Survivors' Benefits

Social Security disability entitlement "freezes" the Social Security earnings record. Social Security regulations stipulate that any years "wholly or partially within a period of disability" will be excluded from the computation of future benefits. Thus, the amount of eventual Social Security retirement benefits, dependents' benefits, or even a subsequent disability or survivors' benefits, may be higher because these lost years of earnings will not be considered in future computations.

Medicare Coverage

After the individual has received SSDI for twenty-four months, regardless of age, he or she also becomes eligible for Medicare benefits. This includes Part A hospital benefits and Part B medical benefits.

Surviving on lower income with mortgages, car payments and other debts is frightening to disabled individuals. When they receive a large check for retroactive benefits, it is difficult to resist the temptation or necessity to use the money to improve their situation. LTD plans were experiencing difficulty collecting this overpayment. The plans were using a variety of collection scenarios:

1. Hope for a lump sum payment by the disabled individual;
2. Recover the overpayment from future benefits ($10,800÷$500=21.6 months); or
3. Refer the individual to a collection agency.

Scenario 1 generally yields a collection rate of 45% to 65% depending on the dollar value of the overpayment. Overpayments of under $10,000 were paid more readily than amounts over $10,000. Scenario 2 only worked if the individual remained on claim long enough to collect the total amount owed. Too often the individual went off claim due to age or death. Additionally, the LTD plan fiduciary lost the time value of money. Worst case is scenario 3, which yields only $0.50 to $0.60 on the dollar. Scenarios 2 and 3 did not promote a positive relationship with the disabled individual. Hence, the inventor recognized the need for assistance in, and a method for, the enhanced recovery of the overpayment.

Furthermore, businesses today are accelerating efforts to reduce direct and indirect costs associated with disability, as well as the related health and legal expenses. Too often that means loss of health insurance and prescription drug coverage to the disabled individual. Additionally, the disabled individual has many financial concerns upon disability. The inventor recognized the need for someone to interact with disabled individuals in the delivery of services and additional assistance after it has completed its standard Social Security and Medicare services. These individuals require a variety of services that are not currently offered as a package of benefits in the industry or through their previous employer. Through surveys with the disabled individuals and their employer clients, the inventor has recognized a need for a package of services to assist the disabled individual after award of SSDI.

The inventor has recognized that qualifying for SSDI is just one step in coping with the practical and financial challenges of disability. The individual still has to consider other life and financial issues. These issues include the following:

Social Security Review—Upon receipt of SSDI, SSA establishes a diary for review of an individual's medical condition.

Social Security Related Tax Decisions—Payment of premiums for LTD has an impact on taxation of the LTD benefit. Once the disabled individual begins to receive SSDI it changes that tax structure.

Disability Related 401(k) Decisions—Plan designs will determine if the disabled individual can leave their 401(k) assets with their employer or if they must move the funds to a self-directed IRA or other investments. Additionally, the disabled individual may need to make withdrawals.

LTD or Workers' Compensation Settlement Assistance—Receipt of SSDI may lessen the dependency on other benefit plans. The disabled individual may desire settlement of other benefits in order to receive a lump sum of money for investments, revisions needed to their home or education for themselves or their dependents.

COBRA Extension—Often the disabled individual is only offered COBRA through their previous employer. Once the SSDI is awarded, the individual may qualify for COBRA extension. This affords them health insurance protection until Medicare entitlement begins.

Medicare and Health Insurance—For employers who do extend group health insurance throughout the disability, utilization of dual health plans is very confusing to the disabled individual. Often, they will continue to use the employer health plan due to familiarity, even though a better benefit would be available by using Medicare as primary and their employer group health plan as the secondary payer.

Expensive Prescription Drugs—Medicare does not cover prescription drugs except in very limited circumstances. Even some employers who do extend health insurance, do not extend prescription drug coverage to disabled employees.

Return to Work Information—If the disabled individual wants to return to work there is a fear of losing benefit coverage.

Finally, in the course of representing uninsured disabled individuals, the inventor recognized that a disabling event affects the disabled individual's life both physically and mentally and leaves him or her with the sense that his or her life is out of control. Although the individual may be entitled to SSDI, on average it takes thirteen months to process a SSDI claim. The likelihood of an uninsured, disabled individual being able to obtain credit or funds from other third-party sources is questionable. Without a sufficient alternative means of support, the individual is presented with immediate financial concerns. The inventor has recognized the need to alleviate the financial concerns of the disabled individual to the extent reasonably possible and to provide a means by which such individual may continue to meet his or her basic needs.

Based upon the foregoing, therefore, it would be advantageous to provide a method of obtaining SSDI, recovering any overpayments of LTD benefits for a client insurance carrier or employer, providing post-award services and savings for the disabled person or client company, and providing financial assistance for disabled individuals during the pendency of their claims.

SUMMARY OF THE INVENTION

The present invention provides methods, generally configured with a computer and software technology, for obtaining Social Security disability insurance benefits (SSDI) from the Social Security Administration (SSA) for disabled individuals, recovering any overpaid amounts for client insurance carriers or employers and maximizing the disabled person's benefits after any award is made.

The instant invention provides methods of recovering overpayments of long-term disability benefits made by private insurers or employers, after a disabled individual begins receiving SSDI from the SSA. The system can employ manual collection of the overpayments but preferably provides for the automatic withdrawal of overpaid benefits. The instant invention provides a method of obtaining SSDI from the SSA and recovery of overpayments of long-term disability benefits that utilizes computer and electronic technology to automate the method. The method also provides means for maximizing the amount of retirement benefits the disabled person would be entitled to at retirement.

The instant method also provides additional ancillary medical, social and financial services to clients after the award of SSDI and provides for the control or management of the disabled individual's benefits, financial assets and specialized needs. The method also provides for financial assistance during the pendency of the disabled individual's claim for SSDI.

In accordance with the invention, briefly stated a method of recovering overpayments of long-term disability (LTD) benefits for a client insurance carrier or employer, after a disabled individual receives SSDI payments, of providing post-award services and savings to the claimant, and of providing financial assistance to the claimant is provided. The overpayment recovery service is seamless and provides for automatic recovery of overpayments from a claimant's account and reimbursement to the long-term disability provider or employer. Overpayments result from the fact that the long-term disability insurance provider or employer has paid long term disability benefits to the claimant when the claimant actually was eligible for SSDI but collected benefits from such private insurer or employer. Once SSDI is awarded by the SSA, a lump sum payment of past benefits by the SSA results in an overpayment to, or "double dip" by, the claimant. The insurance carrier or employer is entitled to recover the overpaid benefits.

A post-award services and savings aspect of the present invention allows a service provider to provide a plurality of services to a claimant, post-award of SSDI, ranging from financial planning services to discounted prescription medications and medical products. A financial assistance arm of the novel method allows a service provider to arrange for funds to be provided to a claimant for expenses during pendency of their claim for SSDI. The overpayment recovery service, the post-award services and savings and the financial assistance program are intended to be integrated. However, each segment of the process may be utilized independently, using a central processor, programs and databases.

BRIEF DESCRIPTION OF THE DRAWINGS

FIG. 4 is the overpayment recovery service input screen 1 which contains client company and claimant information;

FIG. 5 is the overpayment recovery service input screen 2 which contains information on the status of the overpayment recovery service;

FIG. 8 is the overpayment recovery service input screen 5 which contains payment information;

FIG. 9 is the overpayment recovery service input screen 6 which contains a table to record partial payments;

FIG. 10 is the overpayment recovery service final amount due client screen;

DESCRIPTION OF THE PREFERRED EMBODIMENT

Seamless Overpayment Recovery Service (Seamless ORS)

Figure 1:
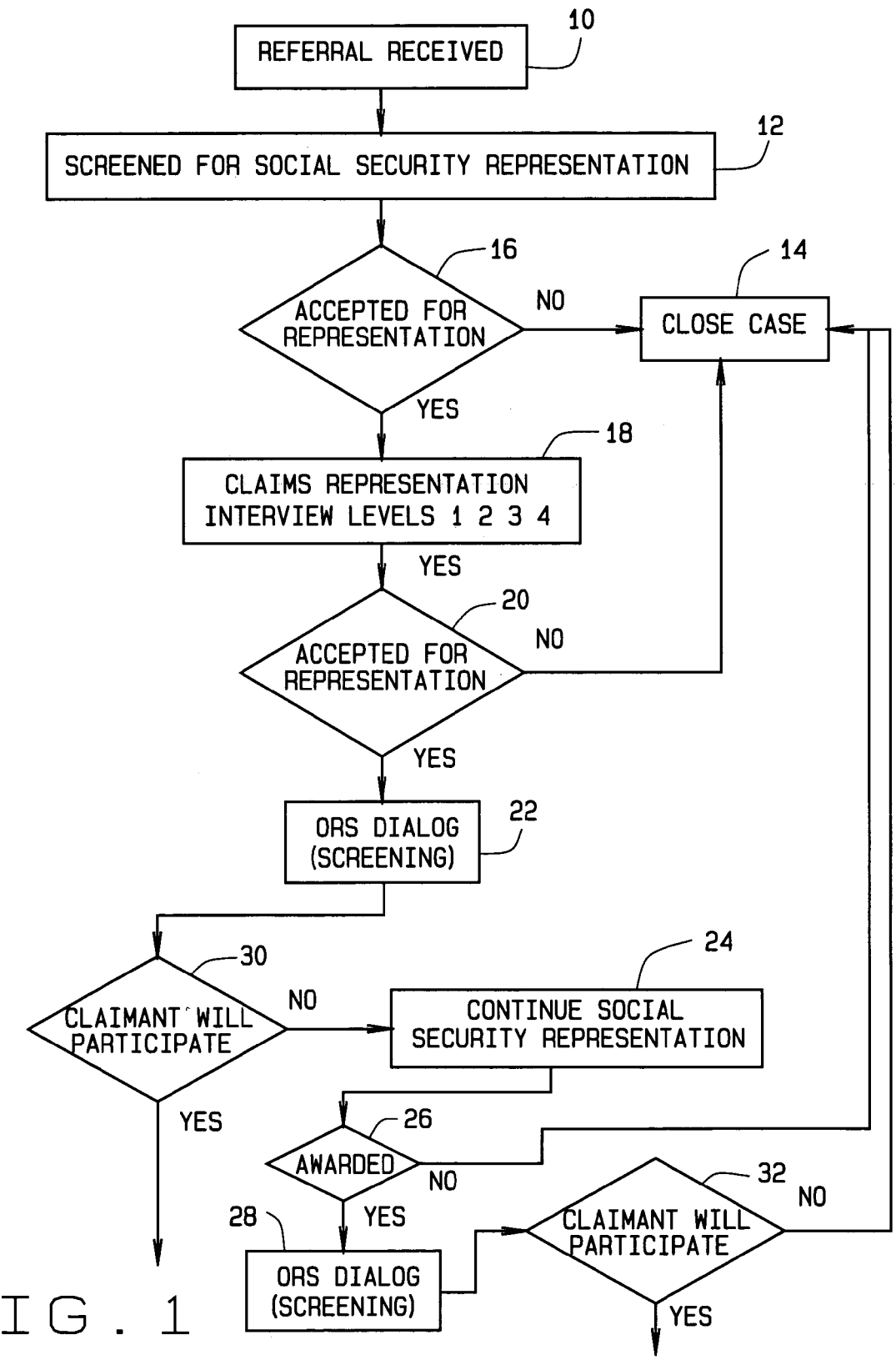
FIG. 1 is a block diagram illustrating the initial steps of the seamless overpayment recovery services method of the present invention.

The instant invention includes specific procedures, computer programs, databases and forms, that, when integrated, meet applicable regulatory provisions and are in compliance with Automated Clearing House Network, Regulation E (regarding electronic funds transfers) and the SSA's rules on the assignment of benefits to permit immediate withdrawal of an overpaid amount of prior paid long-term disability insurance benefits. The overpaid amount is collected directly from a disabled individual's bank account after the SSDI payments have been received by the disabled individual from the SSA. The overpaid amount then is returned to the long-term disability insurance carrier or employer, less applicable fees. By implementing this novel process, the invention increases the success rate of overpaid benefit recovery to 95% within 30 days of the award of SSDI from its former level of 87% to 90% within 60 days of the award.

The method is divided into four major steps, with several important sub-steps. The method of the present invention is best illustrated with reference to the block diagram, FIGS. 1 through 3.

The four major steps of the method include:

1. Initial Social Security Representation, which is designed to secure the award of SSDI from the SSA;

2. Verification Of SSDI Benefit Amount, which is designed to confirm with SSA the SSDI benefit and amount of retroactive payments;

3. Calculation Of The Overpayment Amount, which is designed to expeditiously determine the overpayment of LTD benefits upon receipt of an SSDI award; and 4. Recovery Of The Overpayment, which is designed to recover overpayments through direct withdrawal of finds from the individual's bank account, preferably by electronic "sweeping" of the overpaid amount from a deposit account.

Initial Social Security Representation

The inventor's Social Security Representation is designed to secure approval of SSDI from the SSA. The steps below, and as illustrated in the drawings, outline the representational process through award of the SSDI claim. For purposes of brevity and clarity, the provider of the novel services will be referred to hereinafter as "The Service Provider"; the client disability insurance carrier or employer will be referred to as "the client"; and the disabled individual seeking insurance payments is referred to as "the claimant".

Step 1—Identify SSDI-Eligible LTD Claimants

A.—The Service Provider Receives Referrals

As shown in FIG. 1, a LTD claims examiner, generally employed by the client insurance provider or employer, refers cases to The Service Provider for representation, as indicated by reference numeral 10. The claims examiner submits a completed Social Security Referral Checklist, shown below as Exhibit 1, which provides The Service Provider with an overview of the case and all supporting file documentation. The information from the Referral Checklist then is entered into The Service Provider's computerized databases for processing and screening 12. If the claimant is not accepted for representation, the case is closed 14. If the claimant is accepted for claims representation 16, i.e. is eligible for Social Security disability benefits, the process proceeds to the next major sub-step.

Exhibit 1.

SOCIAL SECURITY REFERRAL CHECKLIST

Referring Company: _____ Client Co. #: _____

Street Address: _____

City/State/Zip: _____

Phone: _____ Fax: _____

Disabled Claimant: _____ Male: ☐  Female: ☐

Street Address: _____

City/State/Zip: _____

Phone: _____ Date of Birth: _____

Social Security #: _____ LTD Policy #: _____

Employer: _____ Occupation: _____

Diagnosis: _____

Date Last Worked: _____ Last SSA Denial: _____

| Insurance Contract Offset: | ☐ Primary Only | ☐ SSA Disability Only | ☐ SSA Widow's Benefits |
| --- | --- | --- | --- |
| | ☐ Primary & Dependents | ☐ SSA Disability & Retirement | ☐ Reduced Retirement |

Diary File:   ☐ 3 Months     ☐ 6 Months     ☐ 12 Months

|  | YES | NO |  |
| --- | --- | --- | --- |
|  |  |  | Current LTD Amount: _____ |
| Is the claimant involved in vocational rehabilitation? | ☐ | ☐ |  |
| Are there dependents in the household? | ☐ | ☐ |  |
| Is the claimant receiving widow's benefits? | ☐ | ☐ |  |
| Is the claim reinsured? | ☐ | ☐ | If yes, by whom? _____ |

Comments: _____
_____
_____

Referred by: _____ Date: _____

B.—The Service Provider Determines Claims Level

The Service Provider determines submission of the claim at one of four levels of the SSDI application process, as shown at 18 in FIG. 1. The four levels include an initial application and three sequential levels of appeals, as follows:

1. Initial Application to Disability Determination Service (DDS) of the SSA;
2. DDS Reconsideration of a previous decision;
3. Administrative law judge (ALJ) hearing and ruling on the claim; and
4. Appeals Council review.

If a claim is denied at any of the above listed levels, The Service Provider automatically submits the case to the next level of the process until the case receives a final approval or denial from the SSA, or the referring claims examiner requests that The Service Provider abandon pursuit of the claim.

Step 2—Obtain Claimant's Authorization

A.—The Service Provider Mails Solicitation Packets to Claimants

Once The Service Provider determines that the disabled individual qualifies for SSDI benefits 20, The Service Provider mails a packet of information to claimant explaining the benefits of obtaining SSDI and how it coordinates with LTD in their case through the novel seamless overpayment recovery service of the present invention.

The Service Provider details its services and requests the claimant authorize it to act as his or her representative before SSA. The Service Provider invites the claimant to call its toll-free number if the claimant has any questions. If The Service Provider has not received a response within seven days, it contacts the claimant to discuss its services.

B.—Claimant Submits Authorizations

The claimant signs and returns three authorization forms to The Service Provider in a postage-paid envelope. The first, SSA Form 1696, authorizes The Service Provider to represent the claimant in the SSDI application process. The second, a consent form, gives permission for SSA to release information to The Service Provider concerning work history, entitlement dates, and prior applications. The third form authorizes The Service Provider to release entitlement information obtained from SSA to the client.

Step 3—Applications and Appeals

A.—The Service Provider Interviews Claimant and Completes Forms on Computer Screens The Service Provider claimant representative (CR or Representative) calls the claimant and secures relevant information to complete the initial application forms for SSDI and the obligation to repay any overpayment resulting from the retroactive award of SSDI.

At this point in the process, the Representative completes the ORS Dialog (Screening) 22, FIG. 4, to gather the appropriate information to facilitate the recovery of the overpaid benefit. The claimant is interviewed and the information is entered into The Service Provider's databases through the use of the ORS client company and claimant personal information screen, FIG. 4. This screen contains information on the client company (pre-entered) and the claimant's personal information, (i.e. name, address, Social Security number, etc.). The computer program allows information screen in FIG. 4 also to pull claim status information from the ORS status screen, shown in FIG. 5 which details the status of the SSDI claim (i.e. awarded, closed, denied, pending, and the level of the claim). As seen in FIG. 1, if the claimant declines to participate in ORS, The Service Provider will continue to represent the claimant before the SSA 24 to obtain SSDI. Also as shown in FIG. 1, if the claim is awarded SSDI from the SSA 26, The Service Provider again can screen the claimant for participation in ORS 28. If the claimant again declines participation, the case is closed.

Figure 2:
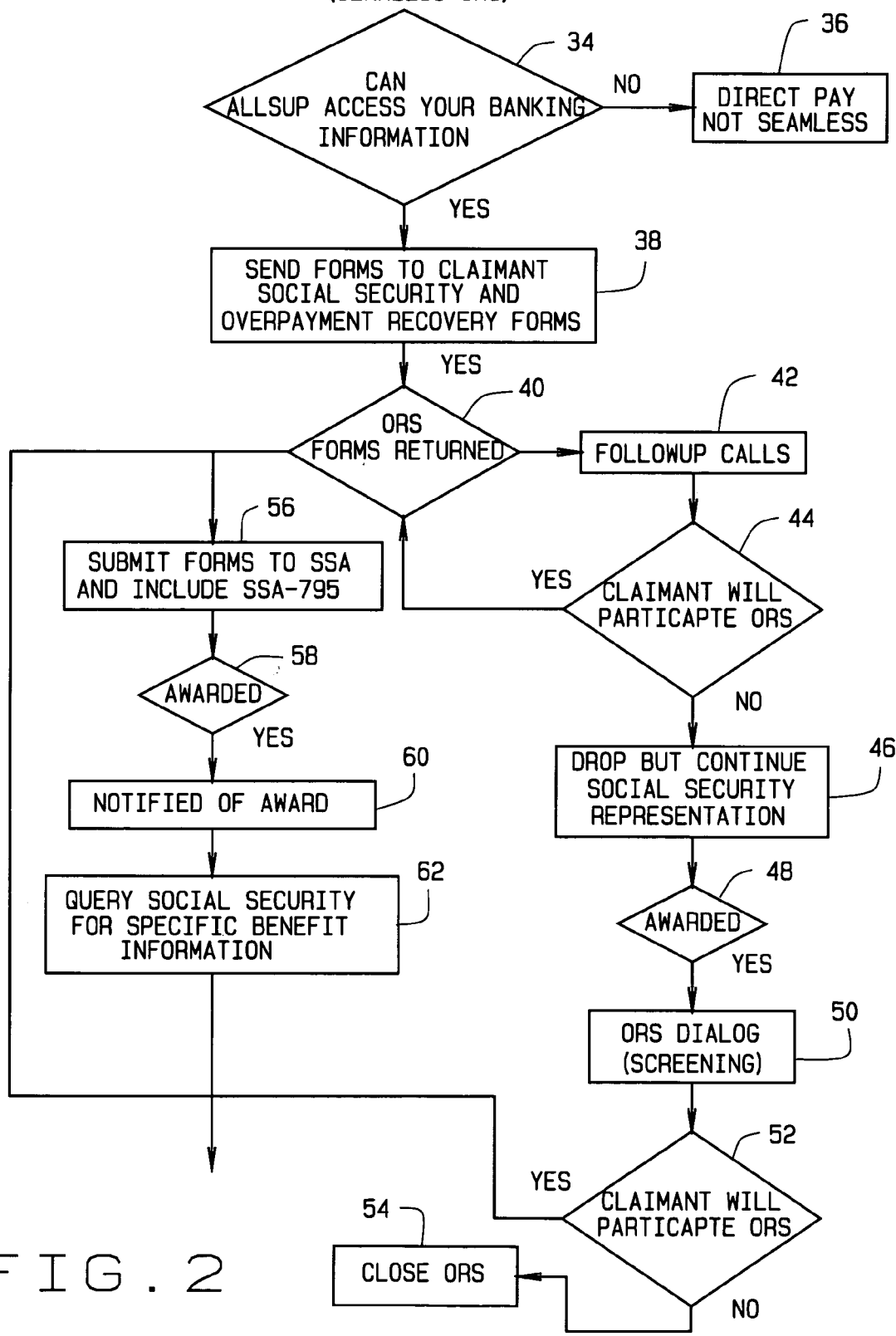
FIG. 2 is a block diagram illustrating additional steps of the novel seamless overpayment recovery services.

If the claimant consents to participation in the Social Security representation with the novel overpayment recovery service 30, either after the initial ORS screening or after the SSDI benefit is awarded 32, The Service Provider obtains written permission from the claimant to access the claimant's banking information 34 in FIG. 2. If the claimant declines, a direct manual payment of the overpaid amount must be made by the claimant to The Service Provider on behalf of the referring insurance company or employer 36.

If the claimant agrees to allow The Service Provider to access his or her banking information, The Service Provider sends to the claimant for signature the appropriately completed form SSA-795 to authorize the SSA to make a direct electronic payment of the SSDI to the claimant's account 38. The Service Provider also forwards for signature the appropriately completed forms that permit The Service Provider to electronically access the claimant's account to recover the overpaid benefit 38.

B.—Claimant Returns Forms

The claimant reviews and signs the initial application and additional forms and returns them in a postage-paid envelope provided by The Service Provider 40. As shown in FIG. 2, if the claimant fails to return the signed authorization forms to The Service Provider, the Representative initiates a follow-up 42. If the claimant still chooses to participate in ORS 44, the forms then are returned to The Service Provider 40.

If, at this point in the process, the claimant declines participation in ORS, the ORS service is discontinued but The Service Provider will continue to represent the claimant before the SSA to obtain the SSDI benefit 46. If the benefit is awarded, The Service Provider again will screen the claimant for participation in ORS. If the claimant again declines participation, the case is closed. If, after receiving the award, the claimant chooses to participate in ORS 48 the claimant again is screened for ORS participation 50. If the claimant agrees to participate at this juncture 52, the ORS forms are returned to The Service Provider, as shown at 40 in FIG. 2. If the claimant again declines to participate in the overpayment recovery service, the case is closed 54.

C.—The Service Provider Submits Application

When the claimant agrees to participate in the overpayment recovery service, at either juncture, The Service Provider CR processes the initial application forms for claims with any necessary documentation to the SSA 56. After SSA enters the claim into its system, it will forward the medical information to DDS.

D.—The Service Provider Accumulates Data and Tracks Progress

The Service Provider CR follows-up with SSA and DDS on a regular basis to track the progress of each application or appeal. The tracking of the progress of each application is accomplished through The Service Provider's centralized data processor driven by appropriate software. Examples of a computer generated data input and tracking screens employed in the novel process include the ORS status screen FIG. 5. The screen FIG. 5 contains information on the ORS status (pending, awarded, refunded, denied/not eligible, if not qualified, the reasons, and what stage of ORS the claim is in). The screen provides the identity of the ORS specialist assigned to the case, an ORS follow-up diary date, information from SSA Form 795, and initial referral status.

Figure 7:
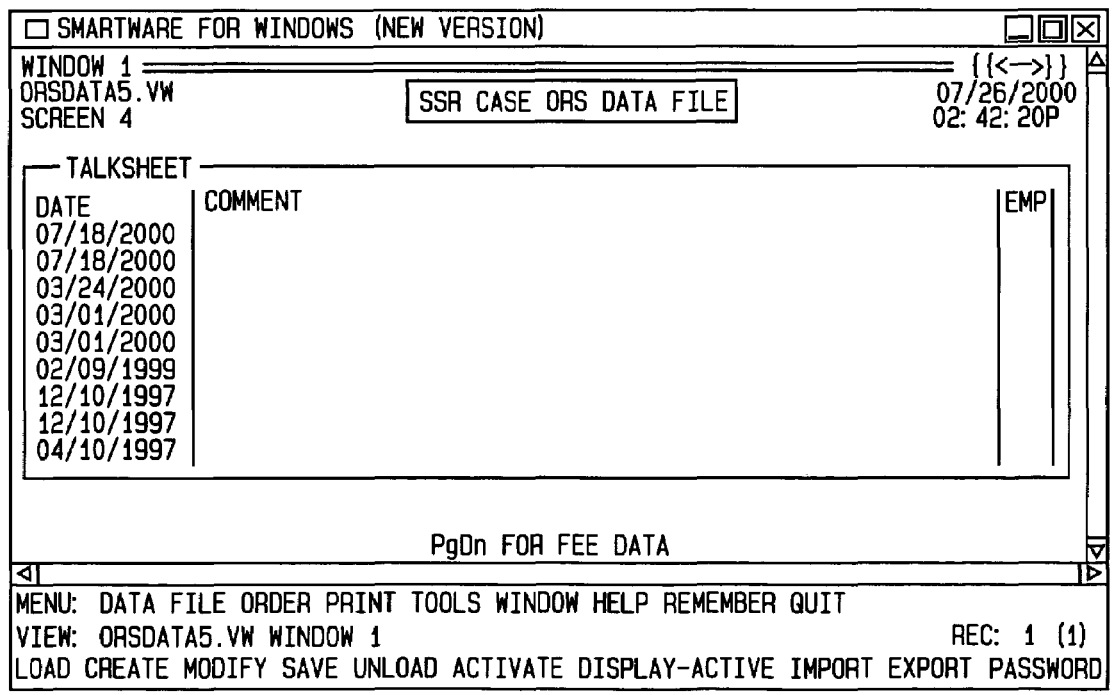
FIG. 7 is the overpayment recovery service input screen 4 which contains log notes.

A log note screen which includes notes in reverse chronological order is illustrated in FIG. 7. The information provided in the log notes, FIG. 7, is entered by The Service Provider, generally by an LTD claims specialist or an ORS specialist of The Service Provider.

Figure 6:
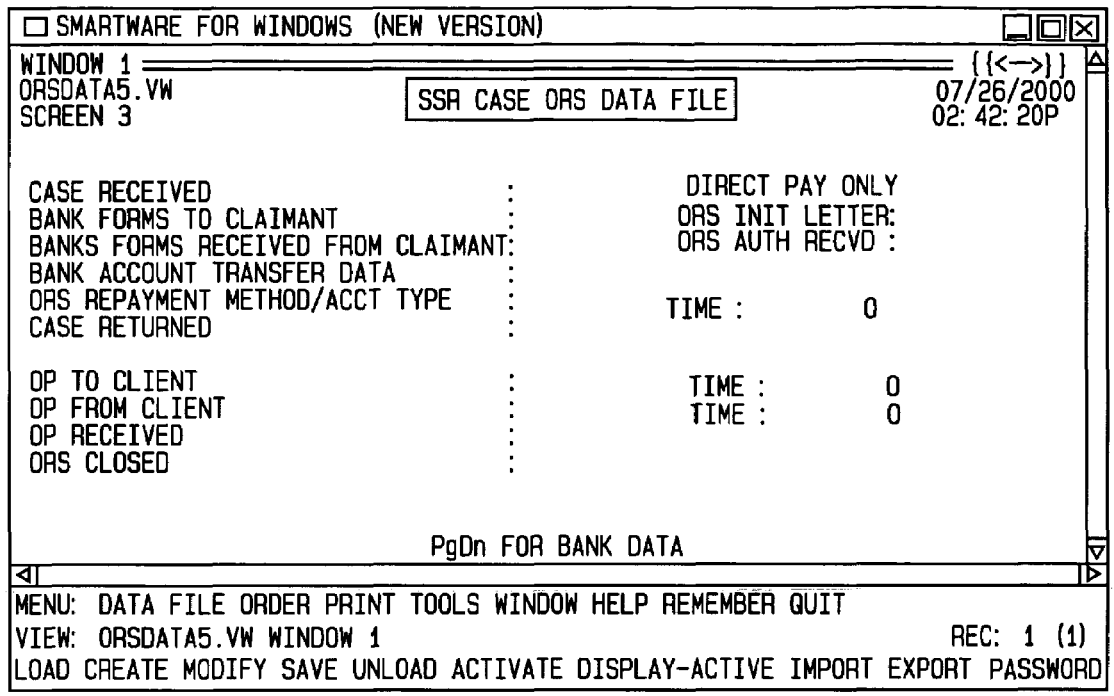
FIG. 6 is the overpayment recovery service input screen 3 which contains overpayment information.

Other aspects of monitoring and tracking are performed by monitoring data entered into the central process through a screen illustrated in FIG. 6. This screen is the overpayment recovery input screen which includes overpayment information. For example, the data includes the date the ORS case was received. It tracks when the bank forms were sent to the claimant and confirms when the signed bank forms were received back from the claimant and allows The Service Provider to track for follow-up. FIG. 6 also indicates when the transfer was made from the claimant's bank account and also indicates the type of ORS repayment to which the claimant has consented. The screen provides the date the payment was made to the client, when an adjustment in the overpayment was received from the client and the date the ORS file for the particular claimant was closed.

The screen indicated as FIG. 8 is the overpayment recovery system input screen which contains payment information such as the amount of retroactive benefit the claimant is entitled to, dependent benefits, extra SSDI monthly payments, gross overpayment amount due to the client, incentives, net overpayment due to the client, the amount recovered, and The Service Provider's fee.

The screen indicated as FIG. 9 provides a table to record partial SSDI payments, i.e. payment amount, payment dates and whether the payment was made for the claimant or a dependent. The screen indicated as FIG. 10 indicates the overpayment recovery system final amount due to the client.

It will be appreciated that the use of the input screen FIGS. 4-10 allow The Service Provider to accumulate sufficient data to operate the system and allows for complete tracking of the status of any pending claim. The software is configured to create and sustain relational data bases so that the information entered into the computer through any of the above described screens subsequently is moved to appear on another screen, if relevant to that screen. Therefore, each datum needs to be entered only once.

E.—SSA/DDS Approves or Rejects Claim

SSA either approves or denies the claim and notifies The Service Provider CR and the claimant.

F.—The Service Provider Notifies Referring Client and Claimant of Decision

The Service Provider Representative notifies the client examiner and claimant of SSA's decision and either initiates Step 4, below—Approval Processing—or continues with the appeals process until final denial or approval is made.

Step 4—Approval Processing

A.—The Service Provider Notifies Client and Claimant of Approval

When the SSA approves a claim and the SSDI is awarded 58, The Service Provider calls, mails or faxes an award notification to the client examiner 60.

B.—The Service Provider Requests Confirmation

The Service Provider requests confirmation of the specific benefit information, including entitlement dates, monthly Primary Insurance Amount (PIA) and retroactive award totals with SSA 62. The appropriate award information is entered into The Service Provider's central processor and databases through the screen FIG. 8.

Verification of SSDI Benefit Amount

The Service Provider's verification of SSDI benefit amount is designed to obtain information regarding the SSDI benefit paid and retroactive amounts. The verification includes two major steps.

Step 1—Claimant Approved for SSDI

A.—Representative Receives Notice

The Representative handling the claimant's SSDI claim receives notice from SSA of a favorable decision.

B.—Representative Notifies Client and Claimant

Upon favorable decision 58, a notice is sent to the client and claimant. The notice informs of the award of SSDI and advises that the specific benefit amount will be forthcoming. The notice also reiterates the claimant's responsibility to repay the overpayment of LTD benefits.

A.—Step 2—The Service Provider Verifies SSDI

The Service Provider requests specific information known as a Fact Query from SSA regarding the award of SSDI 62. This information includes: The PIA (Primary Insurance Amount); benefit increases and effective dates; retroactive amount; date of SSDI award; the debit run date or "DRD"; and date of onset established by SSA. This information is added to the appropriate computer database through screen FIG. 8.

B.—The Service Provider Receives Information from SSA

Figure 3:
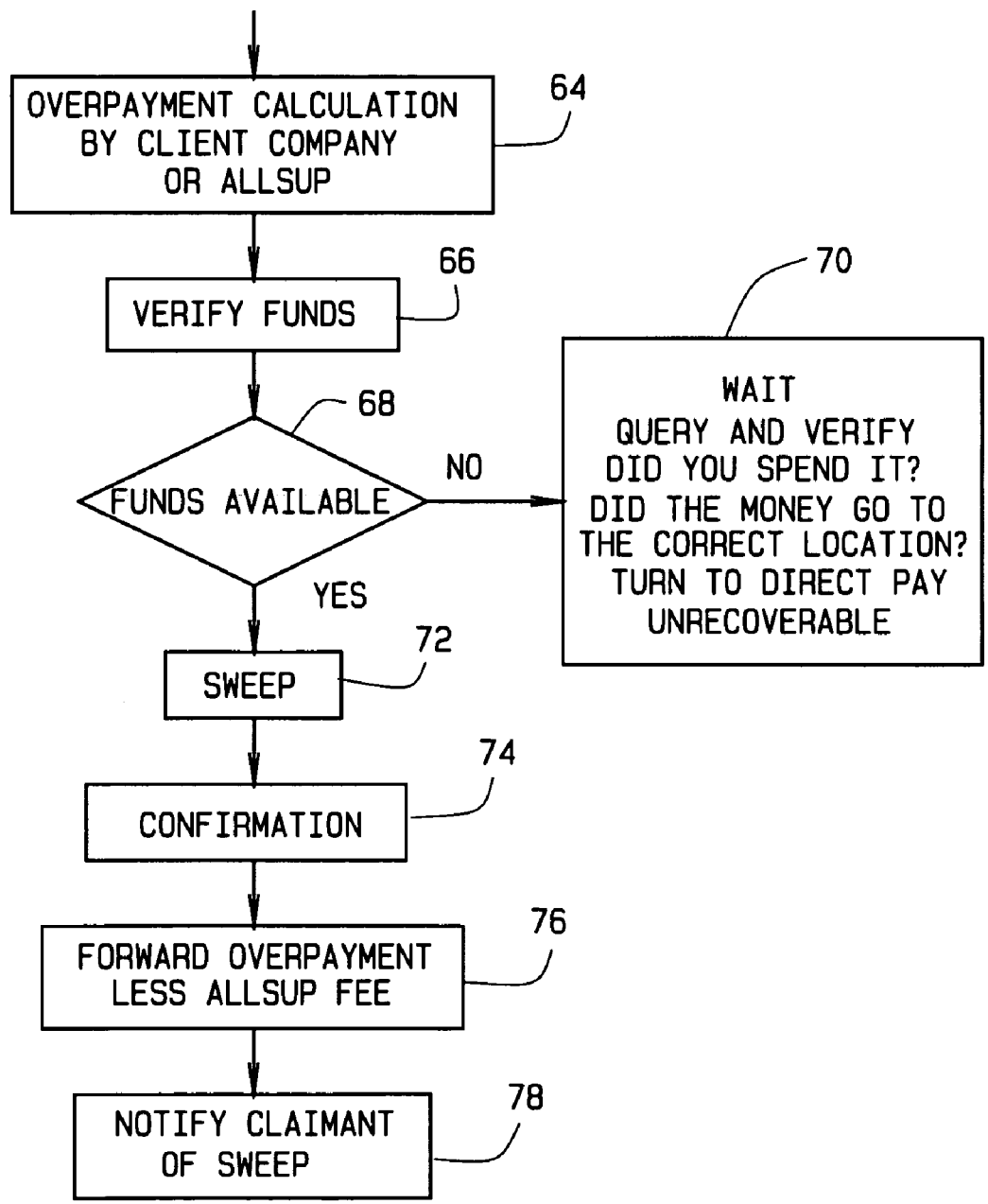
FIG. 3 is another block diagram illustrating additional steps of the novel seamless overpayment recovery services.

Upon receipt of information, The Service Provider calculates the amount of the overpayment, as shown at 64 in FIG. 3.

Calculation of the Overpayment Amount

Calculation of the overpayment amount requires two major steps.

Step 1—Representative Receives SSDI Award Information

The Service Provider CR receives detailed entitlement dates and SSDI benefit amounts from SSA.

Step 2—The Service Provider Calculates the Overpayment

The Service Provider immediately calculates the overpayment upon receipt of SSDI award information and enters the data through screen FIG. 8. See Example 1, following, for a representative example of an overpayment calculation.

Example 1

REPRESENTATIVE OVERPAYMENT CALCULATION

SSDI Award Information

It is October 1999. The claimant has been awarded SSDI benefits effective October 1997. The following information is received from Social Security Administration:

| | |
|---|---|
| Wage Earner Retroactive Benefits payable through 10/03/1999 | $17,462.00 |
| Net Monthly benefit 11/03/1999 and continuing | $ 741.00 |
| Date of Entitlement to Medicare Part A | 10/01/99 |
| Date of Entitlement to Medicare Part B | 10/01/99 |
| Established Date of onset | 04/15/97 |
| Date of entitlement to cash benefits | 10/01/97 |
| Scheduled medical reexam date | 10/01/02 |
| Date payment certified by Social Security | 09/28/99 |
| Monthly payment beginning 10/1/96 for Wage Earner | $ 700.00 |
| Monthly payment beginning 12/1/96 for Wage Earner | $ 721.00 |
| Monthly payment beginning 12/1/97 for Wage Earner | $ 741.00 |

Overpayment Calculation

| | |
|---|---|
| Monthly LTD Benefit | $ 1,500.00 |
| Less SSDI Original Rate | - $ 700.00 |
| New LTD benefit to claimant | $ 800.00 |

| Date | Original LTD | New LTD | Overpayment |
|---|---|---|---|
| 10/1/97 | $1,500.00 | $ 800.00 | $ 700.00 |
| 11/1/97 | 1,500.00 | 800.00 | 700.00 |
| 12/1/97 | 1,500.00 | 800.00 | 700.00 |
| 01/1/98 | 1,500.00 | 800.00 | 700.00 |
| 02/1/98 | 1,500.00 | 800.00 | 700.00 |
| 03/1/98 | 1,500.00 | 800.00 | 700.00 |
| 04/1/98 | 1,500.00 | 800.00 | 700.00 |
| 05/1/98 | 1,500.00 | 800.00 | 700.00 |
| 06/1/98 | 1,500.00 | 800.00 | 700.00 |
| 07/1/98 | 1,500.00 | 800.00 | 700.00 |
| 08/1/98 | 1,500.00 | 800.00 | 700.00 |
| 09/1/98 | 1,500.00 | 800.00 | 700.00 |
| 10/1/98 | 1,500.00 | 800.00 | 700.00 |
| 11/1/98 | 1,500.00 | 800.00 | 700.00 |

| | | | |
|---|---|---|---|
| 12/1/98 | 1,500.00 | 800.00 | 700.00 |
| 01/1/99 | 1,500.00 | 800.00 | 700.00 |
| 02/1/99 | 1,500.00 | 800.00 | 700.00 |
| 03/1/99 | 1,500.00 | 800.00 | 700.00 |
| 04/1/99 | 1,500.00 | 800.00 | 700.00 |
| 05/1/99 | 1,500.00 | 800.00 | 700.00 |
| 06/1/99 | 1,500.00 | 800.00 | 700.00 |
| 07/1/99 | 1,500.00 | 800.00 | 700.00 |
| 08/1/99 | 1,500.00 | 800.00 | 700.00 |
| 09/1/99 | 1,500.00 | 800.00 | 700.00 |
| Totals | $36,000.00 | $19,200.00 | $16,800.00 |

The Service Provider Fee Calculation

<u>Claims Fee:</u>
Flat Fee                                                                $ XXXX.XX <u>Overpayment Recovery Fee:</u>
X % of the Calculated Disability/LTD Overpayment          $ XXXX.XX Total Fees Due:                                                       $ XXXX.XX

---

Amount To Client

Amount received from claimant                              $16,800.00

Less The Service Provider fees                                    -
   $ XXXX

Net amount to Client Company                              $XXXX.XX

Recovery of the Overpayment

Upon the calculation of the overpayment amount, the method provides the following major steps for recovering the overpayment amount from the disabled individual's account. It will be appreciated that the software is configured to perform foregoing calculation upon entry of the appropriate data and the calculated overpayment amount will be viewable through an appropriate screen, as described above.

Step 1—Direct Electronic Withdrawal of Funds

A.—Verification of Funds

As shown at 66 in FIG. 3, the Representative contacts the claimant's bank or the claimant to verify that there are sufficient funds to cover the pre-authorized withdrawal. As stated above, The Service Provider already has obtained appropriate documentation to allow it to directly access the claimant's bank account and recover funds. If the funds are available 68, The Service Provider can proceed with recovery of the overpaid amounts 68. If there are not sufficient funds, The Service Provider can wait for the direct deposit from the SSA 70. Further, The Service Provider can follow up to determine if the funds went to the correct account. Also, The Service Provider can inquire if the claimant had received, but withdrew and spent the money paid by SSA 70. In the event of the latter, The Service Provider can seek a direct payment of the overpaid amount from the claimant or close the case as unrecoverable 70.

B.—Accounting Initiates Withdrawal of Funds

The Service Provider's Accounting Department initiates the process to withdraw or sweep the funds from the claimant's bank account by virtue of the pre-authorization form 72. If the account has insufficient funds to repay the overpayment, the Accounting Department will notify the Representative.

C.—Representative Contacts Client Company

If the claimant does not have sufficient funds to cover the overpayment, the Representative will contact the client company and discuss how it wants to proceed.

D.—Representative Notifies the Claimant

Ten days after the withdrawal, the Representative sends the claimant a confirmation letter with full disclosure of the overpayment and the withdrawal amount 74.

Step 2—The Service Provider Issues LTD Overpayment to the Client

A.—The Service Provider Issues Check to Client Company

The Service Provider subtracts its fee for services performed. It issues a check to the client company 76 along with copies of the ORS Statement and confirmation of withdrawal or copy of the check received from the claimant 78.

Step 3—The Service Provider Furnishes Management Reports

A.—The Service Provider Furnishes Management Reports

The Service Provider furnishes monthly management reports to the client company, which easily can be generated by gathering data represented by the foregoing screens, FIGS. 4-10. The reports are a consolidated listing of all claimants referred for overpayment recovery services and itemize the status of each claimant in the ORS process.

The development of processes and procedures to utilize the pre-authorized withdrawal form and the recovery of overpaid amounts and fees from claimants by electronic funds transfers, is a new concept in a specialized industry. As previously indicated, the invention allows The Service Provider to significantly increase the percentage of claimants from whom the overpayment is recovered and has reduced the amount of time involved to effect such recovery. The process of the present invention imparts other benefits including, but not limited to:

The Service Provider Fees—Social Security Representational Service for Individuals.

Only 32% of the working population are covered by an LTD plan. The Service Provider offers Social Security Representational services for those disabled individuals that are not insured by an LTD plan. Direct payment or escrow accounts were the only methods previously available to obtain its fees. The novel process allows The Service Provider to use a pre-authorization for withdrawal of its fees from the individual's bank account.

Payment of PASS Fees.

Under this novel aspect of the invention to be described in greater detail below, The Service Provider offers claimants its novel Post-Award Service & Savings (PASS) program. The claimant may participate in the PASS program prior to the award of SSDI (which requires the payment of the PASS enrollment fee for a period of 12 months at the time of award of SSDI) or at or after the award of SSDI (either on a monthly or 12, 24 or 36 month basis). The Service Provider provides claimants with a pre-authorization form for the withdrawal of such enrollment fees from the claimant's bank account.

The Service Provider Financial Assistance Program for Claimants.

Under this novel aspect of the invention, as will be described below, in certain disability claims, The Service Provider would extend funds to a claimant during the period such claimant's application for SSDI is being processed. Upon award of SSDI, The Service Provider will electronically withdraw the advanced amount plus interest, if applicable, based on the pre-authorization form signed by the individual.

Post-Award Services and Savings (PASS) Procedure

Entitlement to SSDI produces a variety of additional benefits and benefit-related issues. Based on surveys conducted, the inventor developed a method generally that accomplishes the following:

Provide a membership program for people who qualify for SSDI.

Assist the disabled individual in dealing with the financial challenges of disability.

Afford the disabled individual more control over managing his or her benefits, financial assets and other specialized needs.

Built-in savings for the claimant and the client.

Through direct services by The Service Provider and arrangements with third-party vendors for discount medical products and services, financial advice and viatical services, the inventor has designed the following novel method for responding to the needs of the disabled individual after the award of SSDI.

During the process of Social Security representation, The Service Provider sends to the client an informational brochure offering the PASS program. The disabled individual then has the option of purchasing the program at that time. A limited number of program offerings may be useful to the disabled individual during the processing of a Social Security claim. No enrollment fee is charged for PASS during the application process. However, the individual must commit to a one-year membership upon award of SSDI. A detailed booklet of services and enrollment package are then mailed to the disabled individual.

If the disabled individual wishes to wait, they may purchase a membership in PASS upon award of SSDI or later. A number of membership fee options are available based on the length of membership elected.

Additional discounts of the enrollment fee are available based on the transfer of assets to the investment advisory firm whose services are available under PASS and if the LTD plan administrator or client is using The Service Provider's Seamless Overpayment Recovery Service.

The following section outlines the PASS program offerings. It is divided into three major categories of benefits:
1. Disability and Health Benefit Management;
2. Social Security Integrated Financial Planning; and
3. Discount Medical Products and Services.

Disability and Health Benefit Management:

Entitlement to SSDI produces a variety of additional benefits and benefit related issues. PASS's benefit management services are designed to inform the disabled individual of these benefits and issues and to help manage and fully capitalize on them.

Social Security Continuing Disability Review:

The most important thing after finally obtaining SSDI is keeping the benefit. By law everyone who qualifies for SSDI must have his or her claim reviewed by SSA for continuing eligibility. Members of PASS receive assistance with the review of SSDI benefits. This assistance includes completion of all review documents and other communications with SSA as necessary. Upon enrollment in PASS, the individual will be given their scheduled review date and The Service Provider will diary the, file accordingly for review assistance.

Medicare and Health Insurance Management:

By qualifying for SSDI the disabled individual automatically qualifies for Medicare benefits. Medicare entitlement begins the $24^{th}$ month of Social Security entitlement (the $30^{th}$ month of disability including the full 5-month Social Security waiting period) and is sometimes retroactive depending on how long it took to qualify for SSDI. PASS members receive advice from The Service Provider about enrolling in Medicare Part B and answers to questions about coverage under Parts A and B. The Service Provider helps with Medicare benefit statements, the appeal of certain denied claims and the pursuit of retroactive Medicare recoveries where necessary. If the disabled individual is covered by health insurance other than Medicare, The Service Provider can determine the proper payment order. It will also help evaluate supplemental Medicare health insurance such as Medigap and Medicare+Choice.

COBRA Extension Assistance:

If currently enrolled in COBRA, the disabled individual may qualify for the extension of COBRA eligibility until Medicare entitlement begins. Standard COBRA eligibility is for 18 months. However, COBRA requires that employers offer an extension of eligibility from 18 to 29 months, if the disabled individual qualifies for SSDI during the initial 18-month COBRA period and the disability date established by SSA is within the initial 60-day COBRA enrollment period. Since Medicare begins the $30^{th}$ month of disability, the extension of COBRA would provide uninterrupted health insurance from the initial date of disability. As a PASS member, The Service Provider coordinates the individual's COBRA benefits. With appropriate consent, The Service Provider will forward a copy of the Social Security award notice to the COBRA health plan administrator to qualify for this extension.

Social Security Return-to-Work Information and Assistance:

Social Security provides for a 9-month trial work period without loss of benefits. Some individuals may continue work after this time period and still receive SSDI. Additionally, recently enacted legislation allows a disabled individual to return to work and to continue Medicare benefits for up to 8½ full years after the disabled individual first returns to work. The Service Provider helps the individual navigate all these issues upon return to work and provides the necessary reporting to SSA. The Service Provider also coordinates any return to work with the LTD or Workers' Compensation benefit administrator(s).

Social Security-Integrated Financial Planning

Similar to its benefit management services, The Service Provider's financial planning services are designed to help manage financial issues that are produced by SSDI. They are also designed to help manage financial affairs to adequately compensate for the individual's changed lifestyle and reduced income due to disability.

Tax Planning:

Due to the time it normally takes to obtain SSDI, there likely will be an initial retroactive payment before regular monthly benefits begin. This retroactive lump sum may have tax implications.

If the employer paid the LTD premium, the LTD benefit has been taxable. However, when the individual refunds the majority of this retroactive sum to the LTD plan as an overpayment, they are replacing the fully taxable LTD benefits with only partially taxable SSDI. This will result in a tax overpayment, requiring a decision on how to allocate the tax.

On the other hand, if the disabled individual paid the LTD premium instead of the employer, the LTD benefits may not have been taxable. Since SSDI is partially taxable, the individual may now have a tax liability due to receipt of SSDI. The Service Provider assists PASS members in understanding the tax consequences of SSDI.

Investment Advisory Services:

There are two immediate investment issues when the disabled individual qualifies for SSDI. One, because the individual is no longer working due to a disability, they may have decisions to make regarding their 401(k) plan assets. Options can include leaving the plan assets with the current plan administrator or rolling them into an IRA or other allowable investment vehicle. Two, disability qualifies the individual to make an early withdrawal from 401(k) funds or IRA plans and allows the individual to avoid the IRS 10% early withdrawal penalty. The Service Provider assists PASS members with both transactions. Through arrangements with an investment advisory firm, if the individual chooses to roll over the 401(k) or other funds, a representative from the investment advisory firm will answer all questions regarding available options and provide whatever additional assistance is needed. The representative will also coordinate with The Service Provider to ensure the application of the PASS asset management discount. Additionally, The Service Provider will forward a copy of the individual's Social Security award to the 401(k) administrator if necessary. However, the representative will also work to develop investment strategies geared to the individual's needs so they minimize the necessity of early withdrawals from retirement funds. This investment advice will take into consideration the individual's current investment portfolio (401 (k), other retirement plan assets, and pension distributions) and income from all sources including SSDI and LTD benefits.

LTD Settlement Analysis and Referral:

Because receipt of SSDI will reduce the LTD benefits, the level of dependence on the LTD benefit may decrease. As a result, the disabled individual and their employer or LTD carrier may be interested in settling the LTD claim. Such a settlement could be to their financial advantage. PASS members will receive assistance with pursuit of a possible settlement.

The Service Provider's role in any settlement transaction would be threefold:

First, it will contact the employer or LTD carrier to determine if they would be interested in settlement of the LTD claim.

Second, if there is interest, The Service Provider will obtain an estimate of a likely settlement offer. It then will evaluate this estimate in conjunction with other income, assets, financial objectives and risk tolerance through the investment advisory services previously described.

Third, if this estimated settlement appears to serve the disabled individual's financial needs and objectives, and they approve, The Service Provider will notify the employer or LTD carrier that they would like to receive an actual settlement offer. The actual offer would then have to be evaluated by the individual's legal counsel. The fees associated with such a review would have to be paid by the employer or insurer and/or the individual and will likely be required by the employer or insurer.

PASS's advance financial planning positions the disabled individual for a possible settlement. The disabled individual and their legal counsel evaluate and consider the actual settlement offer.

Workers' Compensation Structured Settlement Assistance:

If the individual receives workers' compensation benefits, receipt of SSDI can open the door to a possible "structured" settlement of the individual's workers' compensation claim. If the individual is interested in considering whether a settlement of his or her workers' compensation claim may be to his or her advantage, as a PASS member, The Service Provider will assist with such an evaluation. The evaluation is based on the rules that apply in the state where the injury or illness occurred. As with The Service Provider's LTD settlement assistance, advance financial planning and retention of legal counsel is utilized to protect the individual's interests.

Viatical Settlement Assistance:

If reduced income due to an individual's disability has created an urgent need for additional funds, the disabled individual at least needs to be aware of one additional possibility to raise such funds. The future life insurance proceeds owned may be assigned to a viatical company for immediate cash amounting to a percentage of the future value of life insurance. Because the individual is relinquishing the current beneficiary's rights to life insurance proceeds upon death, consideration of a viatical settlement, in general, is made only in extreme circumstances. However, if the individual decides a viatical settlement is absolutely necessary, The Service Provider can obtain a settlement offer from a reputable viatical settlement company. As with the LTD and Workers' Compensation settlement assistance, advance financial planning and the retention of legal counsel is utilized to protect the interests of the individual.

Discount Medical Products and Services

Through an arrangement with a national provider of prescription benefits or through services provided directly by The Service Provider, medical products and services are available to help the individual manage their disability. These products and services are available at substantial discounts from what can be obtained in the retail market. Actual savings depend on the individual's current health insurance, if any, and its cost and coverage. These products and services are not intended to provide all medical needs or replace the need for a physician. They are only intended to serve certain basic, day to day needs for an individual with a disability. All of these products and services are obtained by the individual calling The Service Provider's PASS 800 toll free number. The initial selection is described below.

Discount Prescription Drugs:

Discounted drugs are shipped to an individual's doorstep within 48 hours when using the Internet pharmacy. Orders can be placed by the individual calling The Service Provider's PASS 800 toll free number, or in person, by the individual visiting one of the participating pharmacies. Orders also can be placed by regular mail, e-mail in certain cases, or through the Internet. Prescription drugs are discounted, on average, 25% to 40% less than retail prices. Additionally, more than 28,000 other pharmacy products are also available at discounted prices.

Vision Care:

Savings are available on eye care needs of up to 50% on frames, 45% on bifocals, and 20% on non-disposable contact lenses at over 6,500 locations nationwide. Discounts are also available on eye exams at participating optometrists and ophthalmologists.

24-Hour Healthline:

Twenty-four hours a day, seven days a week access to confidential, non-directive health and education counseling by registered nurses.

Drug and Disease Education:

The disabling condition may be one of those for which the pharmacy network has developed drug and disease educational materials. Members of PASS, whose prescriptions would indicate treatment of selected conditions, may receive educational materials.

Drug Utilization Review:

When harmful drug interactions are identified, this service will normally notify the individual and their healthcare provider.

Medical Information Storage and Retrieval:

If desired, The Service Provider will store the medical information from the individual's Social Security file in The Service Provider's computer system and refer it to treatment sources upon request.

Illness Management Information:

Upon request, The Service Provider will help obtain for the individual more detailed information and assistance on coping with a particular illness or injury. The Service Provider can identify and refer the individual to associations and other support groups locally who are familiar with their medical condition.

Newsletter:

A quarterly newsletter providing the latest information on medical research, healthcare news and legislation that could affect the individual, their disabling condition and disability benefits.

Service Center:

A toll-free hotline that provides access to all of PASS's medical products and services.

It will be appreciated by those skilled in the art that for the purposes of the instant invention and the appended claims, the term "ancillary financial services" is intended to include the foregoing Social Security continuing disability review; Medicare and health insurance management; COBRA extension assistance; Social Security return-to-work information and assistance; Social Security—integrated financial planning; tax planning; investment advisory services, including brokerage services; LTD settlement analysis and referral; worker's compensation structured settlement assistance; viatical settlement assistance; loans, including loans or cash advancements made under the below described financial assistance method and any other financial services not specifically listed such as preferred provider health coverage; reduced interest credit cards; and so forth.

Likewise, the term "ancillary medical services" is intended to include discount medical products and services, prescription drug plans and services including discount pharmacy services and mail order pharmacy services; respiratory care; physical therapy; 24 hour telephone access to health care information or professionals; drug and disease education; drug utilization and review; illness management; home health; hospice; medical information newsletter; service center; dental services, dentures; eyeglass and optometric care, genetic counseling or any other form of ancillary health care or medical service now known or known in the future.

The PASS program is a method for providing a package of benefits presently not offered to the disabled individual through insurers or through employers. PASS meets the needs of both of The Service Provider's customer bases to whom it regularly provides SSDI and Medicare services, that is, it is offered to disabled individuals and to LTD, Workers' Compensation and Group Health Plans.

Because PASS is designed for disabled individuals who are entitled to SSDI, the individual The Service Provider represents moves seamlessly from its Social Security assistance program into PASS. PASS provides needed services to individuals that reduce the LTD, workers' compensation and group health plan liability of the employer or insurer. The PASS program is designed to create a multiple means of payment through the benefits and savings that are generated from its integrated features. As discussed below, employers and insurers can benefit from the "value added" aspects and savings.

Employers or carriers benefit from the PASS program as PASS allows the employer or carrier the following advantages:

Immediate recovery of the LTD overpayment by way of electronic funds transfer through the seamless overpayment recovery service described in detail above.

Earlier SSDI offset for LTD and certain workers' compensation claims;

Earlier Medicare primary payment;

Higher Social Security offset for LTD claim and "reverse" offset for certain workers' compensation claims;

Structured settlement of workers' compensation claims at significantly lower costs;

Advance financial planning for LTD settlements with referral only of interested and financially feasible settlement candidates for settlement offers;

Rehabilitation, reimbursement and additional Social Security offsets for LTD and workers' compensation claims with additional LTD and workers' compensation claim terminations by return to work;

Initial Medicare primary payment; retroactive status to Medicare primary payment; retroactive Medicare recoveries;

Continuing LTD and workers' compensation offsets and Medicare primary payment;

Identification if COBRA enrolled; extension of COBRA from 18-29 months through coordination with COBRA plan administrator if Social Security award obtained within the 18-month COBRA benefit period; and A valued added program for discount medical products and services.

It will be appreciated that the services offered by The Service Provider through this method can be offered directly by The Service Provider or by qualified third party providers under contract with The Service Provider. It also will be appreciated that the scope and type of service offerings included under the method of providing these services can be modified and/or expanded to meet the changing needs of the disabled individual and variety of plans served without departing from the scope of the appended claims.

Therefore, the post-award services included in this detailed description should be viewed as illustrative and does not constitute an exhaustive list of post-award services. Additional post-award services known or unknown are intended to be included within the scope of the present invention.

Figure 11:
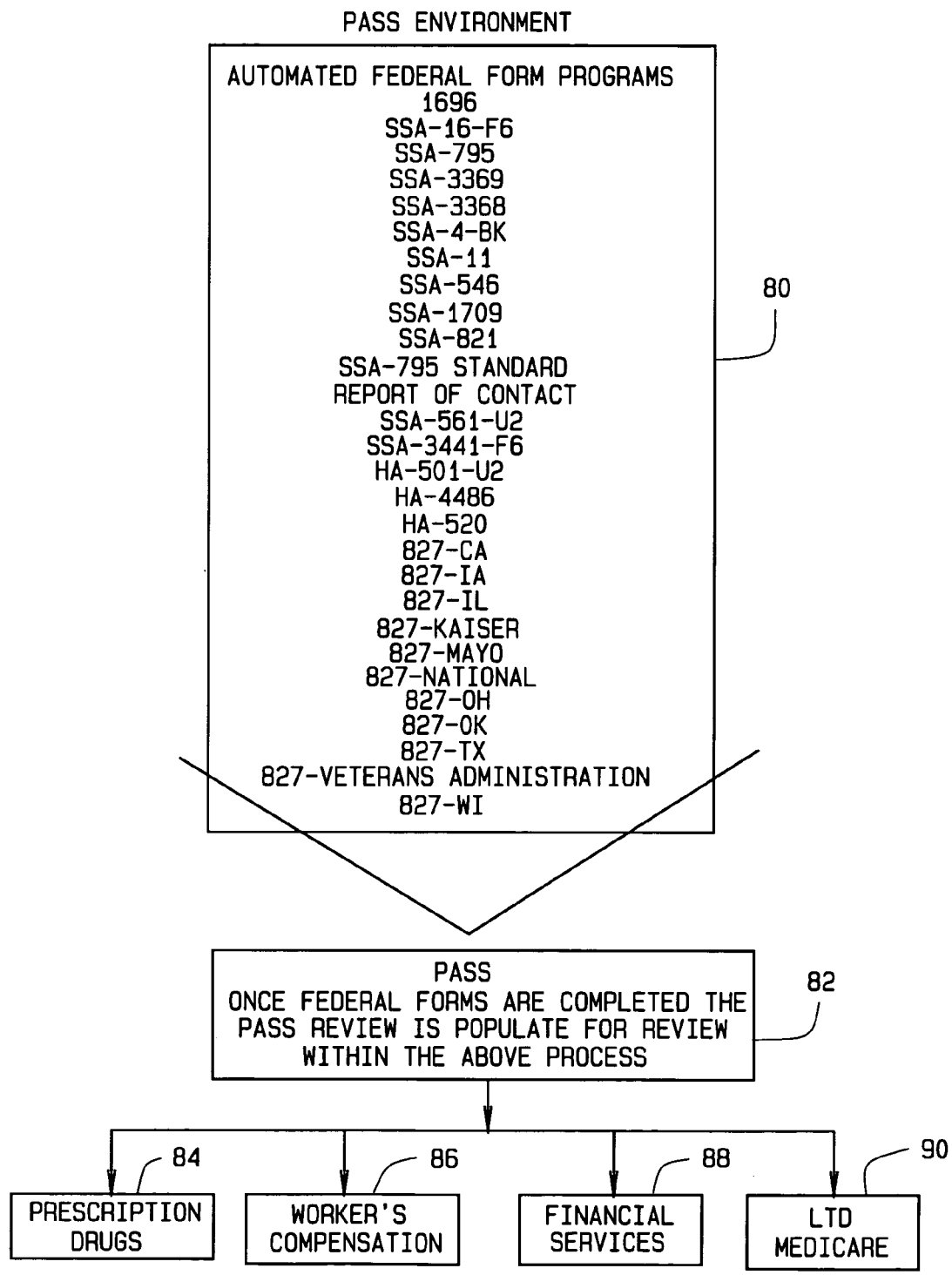
FIG. 11 is a schematic illustrating the plurality of databases from which data is contributed to determine qualification for post award service and savings program
Figure 12:
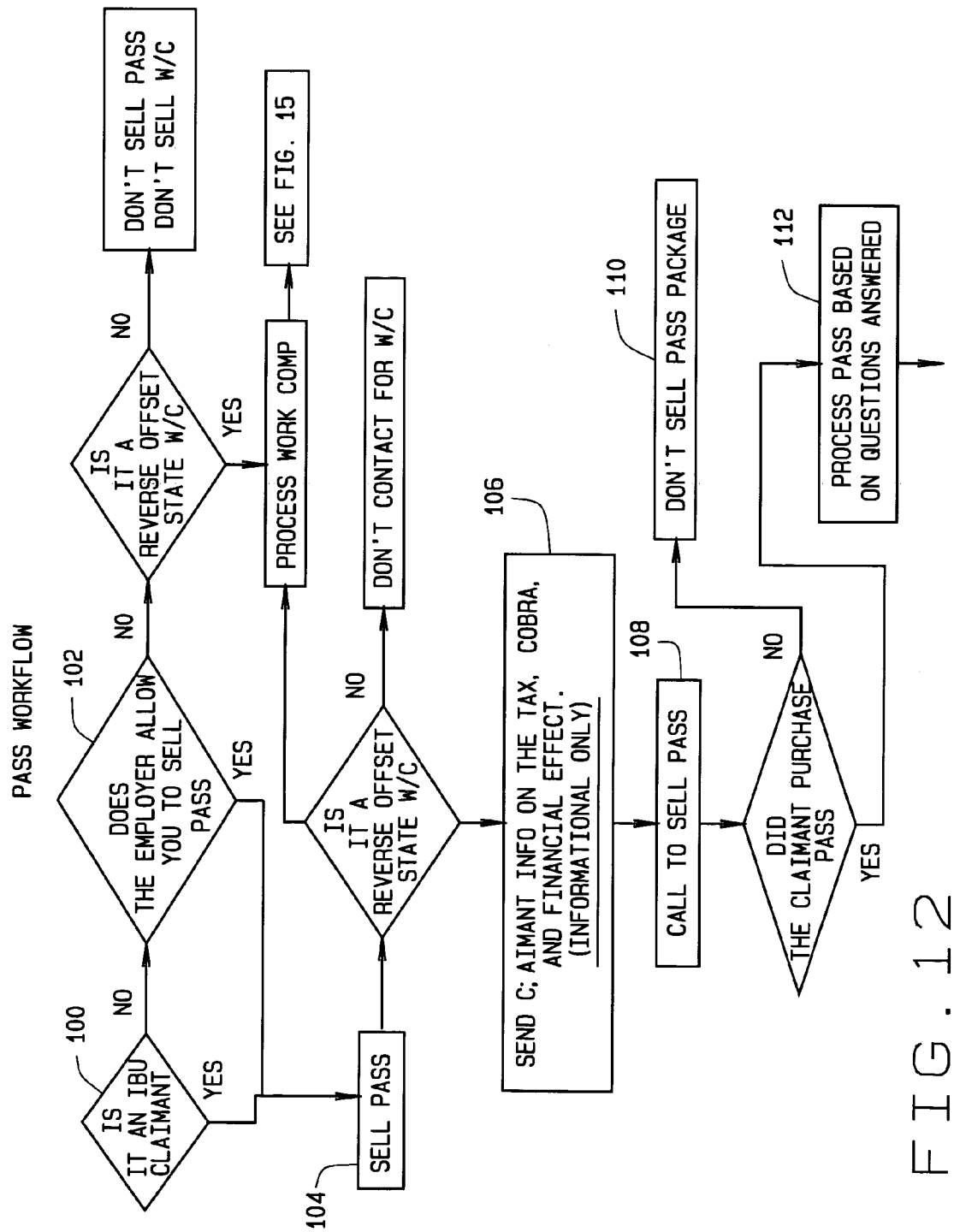
FIG. 12 is a schematic illustrating the application of claimant information obtained from automated federal claims forms to the post award services and savings method of the present invention.
Figure 14:
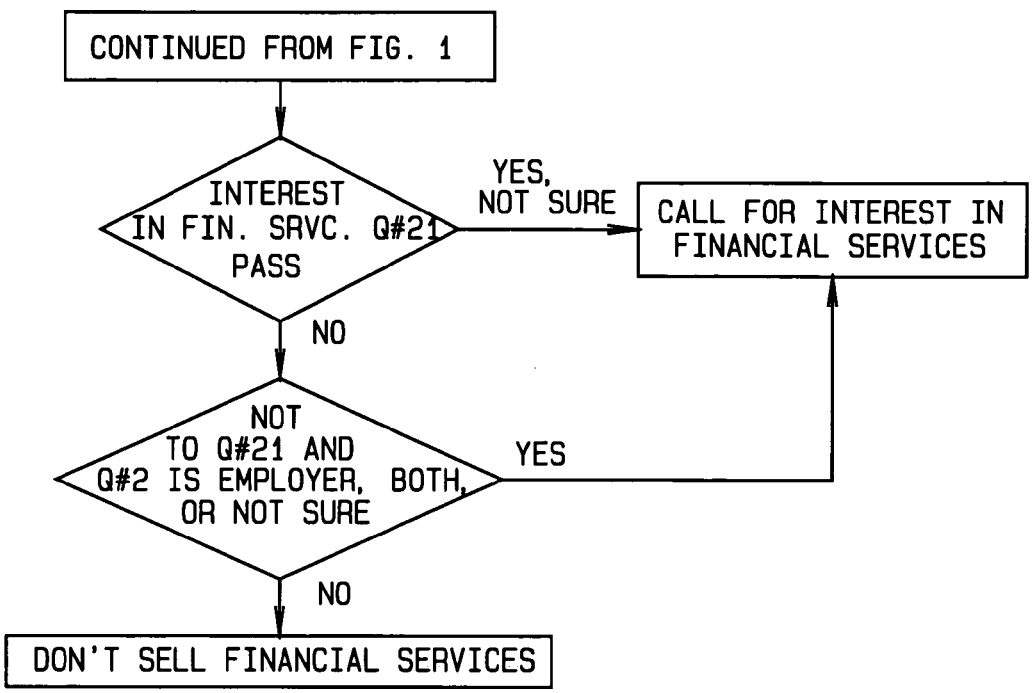
FIG. 14 is a continuation of the block diagram of FIG. 13.
Figure 15:
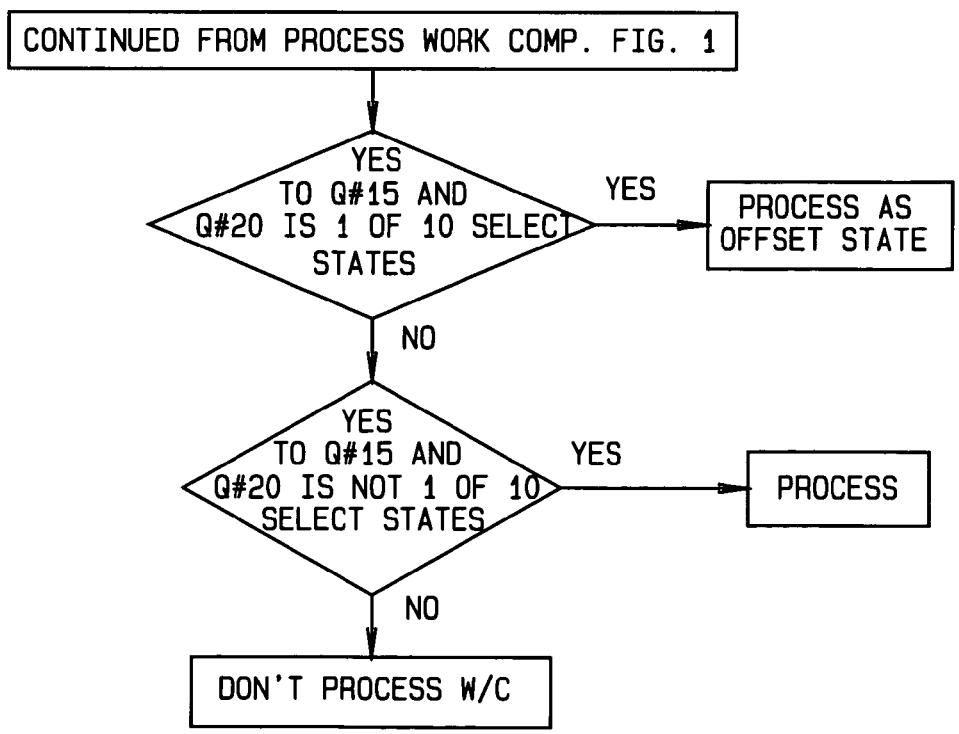
FIG. 15 is another continuation of the block diagram of FIG. 13.
Figure 16:
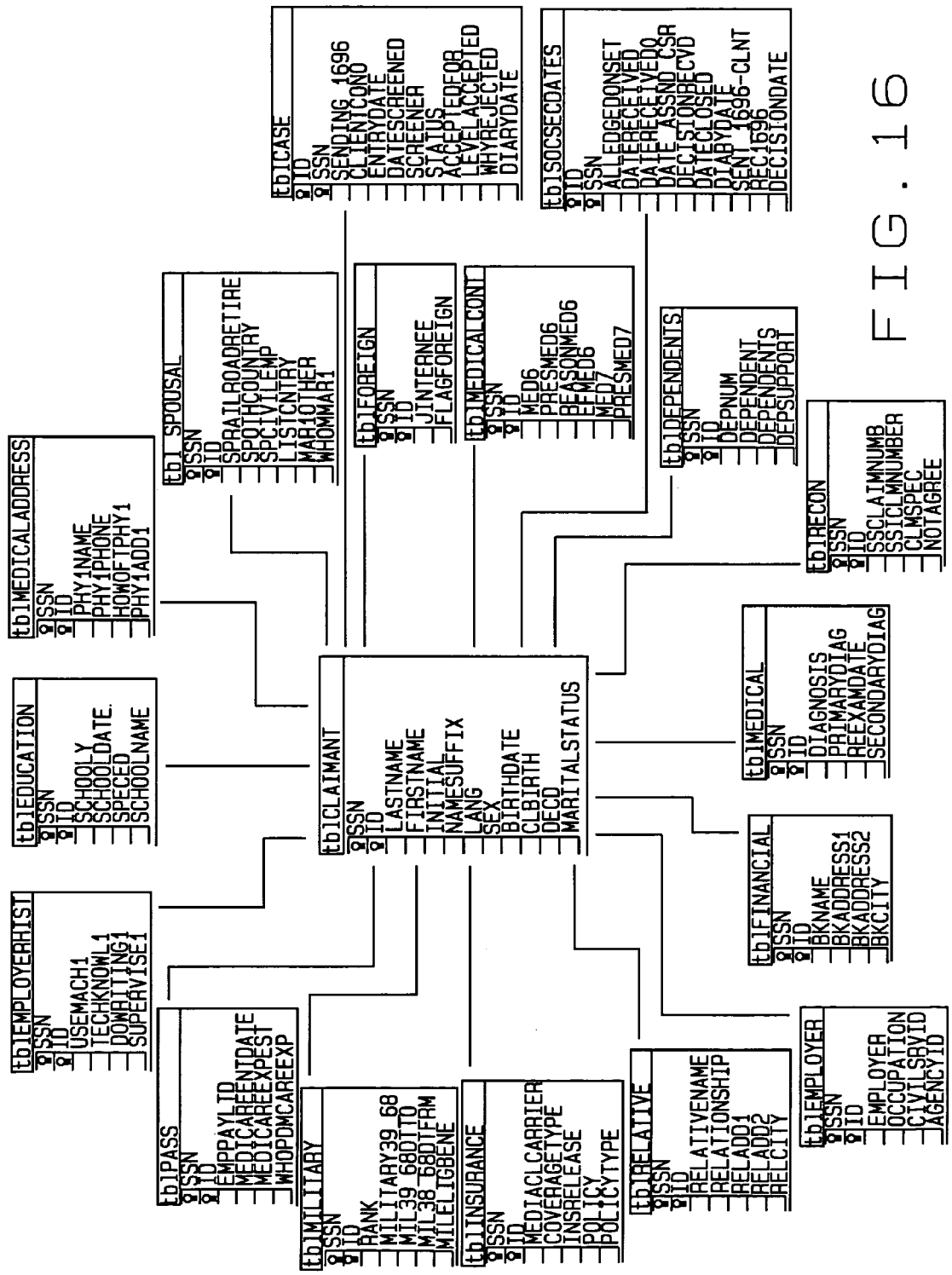
FIG. 16 is a partial listing of data bases displaying the method of the present invention.

Detailed PASS Procedures:

Operation of the post-award services and savings (PASS) program is best illustrated in FIGS. 11-16. First, it will be noted that one novel aspect of the procedure is that The Service Provider data processor software is configured to capture, assimilate and utilize information from a myriad of automated federal forms. As shown in FIG. 11, there are a number of publicly available automated federal forms that can be utilized in various aspects of The Service Provider's core business. These forms are indicated at 80 in FIG. 11. Heretofore, each automated form was freestanding or unrelated. The software employed in the present invention is configured to gather, analyze and utilize the information provided by any one or more of forms from this extensive list of automated federal forms. Once any of the relevant automated federal forms are completed, the software extracts relevant information and populates databases that are interactive with and provide data for a PASS review form 82, FIG. 11. FIG. 16 is a printout of a partial listing of databases included in the software. These databases are relational and provide an integrated repository of vital information.

Data from any relevant databases automatically populate the PASS Program Additional Interview Questions as shown below:

PASS Program Additional Interview Questions

Date: _____          Consultant Name: _____

Claimant Name: _____ SSN: _____

Client Company #: _____        Client Co. Name: _____

Referral Type: ☐ LTD   ☐ ERS   ☐ IBU   ☐ WC  (Yellow Folders Only)

1. When did you stop working because of your disability? _____

*Try to obtain the earliest possible Onset Date. (Attempt to write off unsuccessful work attempts if necessary.)*

3. Did you or your employer pay your LTD premiums?

☐ N/A   ☐ Employer   ☐ Myself   ☐ Both   ☐ Not Sure

Employer Name: _____

City and State(Headquarters): _____ Phone(Headquarters): _____

Notes _____

M _____

*Inform the claimant that if awarded SSDI benefits, it will require a tax planning decision based on who paid the LTD premium.*

4. If your Social Security claim is awarded, would you be interested in a possible LTD settlement?   ☐ Yes   ☐ No   ☐ Not Sure

*Inform the claimant that because the LTD benefit will be reduced by the Social Security amount, the lower LTD benefit MIGHT make a settlement feasible. (Warning: Emphasize we are in no way suggesting a settlement, nor do we even know if the employer or LTD carrier would be interested in a settlement. We are just gathering information.)*

4. Project 30 months from the date of disability to determine the Medicare entitlement date. Medicare entitlement date is _____.

*Inform the claimant of the projected Medicare entitlement date if SSDI is awarded. If the projected date is prior to the initial interview, determine if the claimant has incurred medical expenses since that date. If the claimant HAS incurred medical expenses since that date, inform the claimant that a retroactive Medicare claim can be filed at the time of the Social Security award.*

5. Please estimate your medical expenses since the Medicare entitlement date. _____.

6. Who paid or will pay these expenses?

☐ Myself   ☐ Health Insurance   ☐ Both   ☐ Neither

*If there are high out-of-pocket costs, inform the claimant of the need to look for discounted prescription drugs at a lower price.*

15. Have you filed for Workers' compensation benefits?   ☐ Yes   ☐ No

Notes _____

16. Are you currently receiving Workers' Compensation benefits?   ☐ Yes   ☐ No

Notes _____

17. Does an attorney represent you in your Workers' Compensation claim? ☐ Yes ☐ No

Notes _____

18. Are you considering a possible Workers' compensation settlement?

☐ Yes   ☐ No   ☐ Not Sure

Notes _____

19. Who is your Workers' Compensation administrator/insurance company?

Insurance Carrier Name: _____

City and State: _____   Telephone: _____

20. Which state pays your Workers' Compensation benefits? _____

*If reverse offset state (Colorado, Florida, Louisiana, Minnesota, Montana, New Jersey, North Dakota, Oregon, Washington or Wisconsin), inform the claimant to let the WC carrier know of the SSDI award to prevent a WC overpayment.*

21. Do you have any retirement funds or other investments? ☐ Yes ☐ No ☐ Not Sure ☐ 401(K)   ☐ Pension   ☐ IRA   ☐ Annuities   ☐ Other_____

Estimated Amounts of each that applies? _____
(Inform claimant a "ball park" estimate is sufficient.)

*Inform the claimant that we need this information for two reasons. One, to make sure the claimant is not eligible for SSI benefits. Secondly, if needed, the claimant might be eligible to make an early withdrawal from a 401K and/or IRA plan(s) on the basis of disability and avoid the IRS 10% early withdrawal penalty.*

*Refer the case to your manager if you sense the claimant suffers from a terminal condition, or if in dire financial circumstances.*

Line 1_____
Line 2_____
Line 3_____
Line 4_____

Any data that is not automatically entered into the PASS Program Additional Interview Questions, is gathered through an initial interview and entered through the screen. It will be appreciated that the PASS Program Additional Interview Questions is provided as a computer screen and can be utilized by a telephone interviewer. The interviewer does not have to question a claimant regarding any data preentered on the form by the software, making the interview process less intrusive and faster. Furthermore, the PASS Program Additional Interview Questions includes a number of prompts, shown in italics, for advocating the PASS service.

Once the PASS Program Additional Interview Questions is completed, it is analyzed to see if the claimant qualifies for any of a number of post award services. FIG. 11 shows four core post-award services: prescription drugs 84, worker's compensation 86, financial services 88, and Medicare long term disability benefits 90.

FIGS. 12-15 indicate, in diagrammatic form, the PASS workflow engaged in by The Service Provider. The Service Provider determines initially the status of the claimant. If the claimant is an Independent Business Unit (IBU) 100, The Service Provider is free to sell PASS. An IBU is a claimant not referred by a client, employer or administrator. If the claimant is not an IBU, The Service Provider must determine if the employer allows The Service Provider to provide PASS 102, and if it does The Service Provider is allowed to sell the PASS program to the claimant. If not, the claimant goes into the worker's compensation inquiry set.

Figure 13:
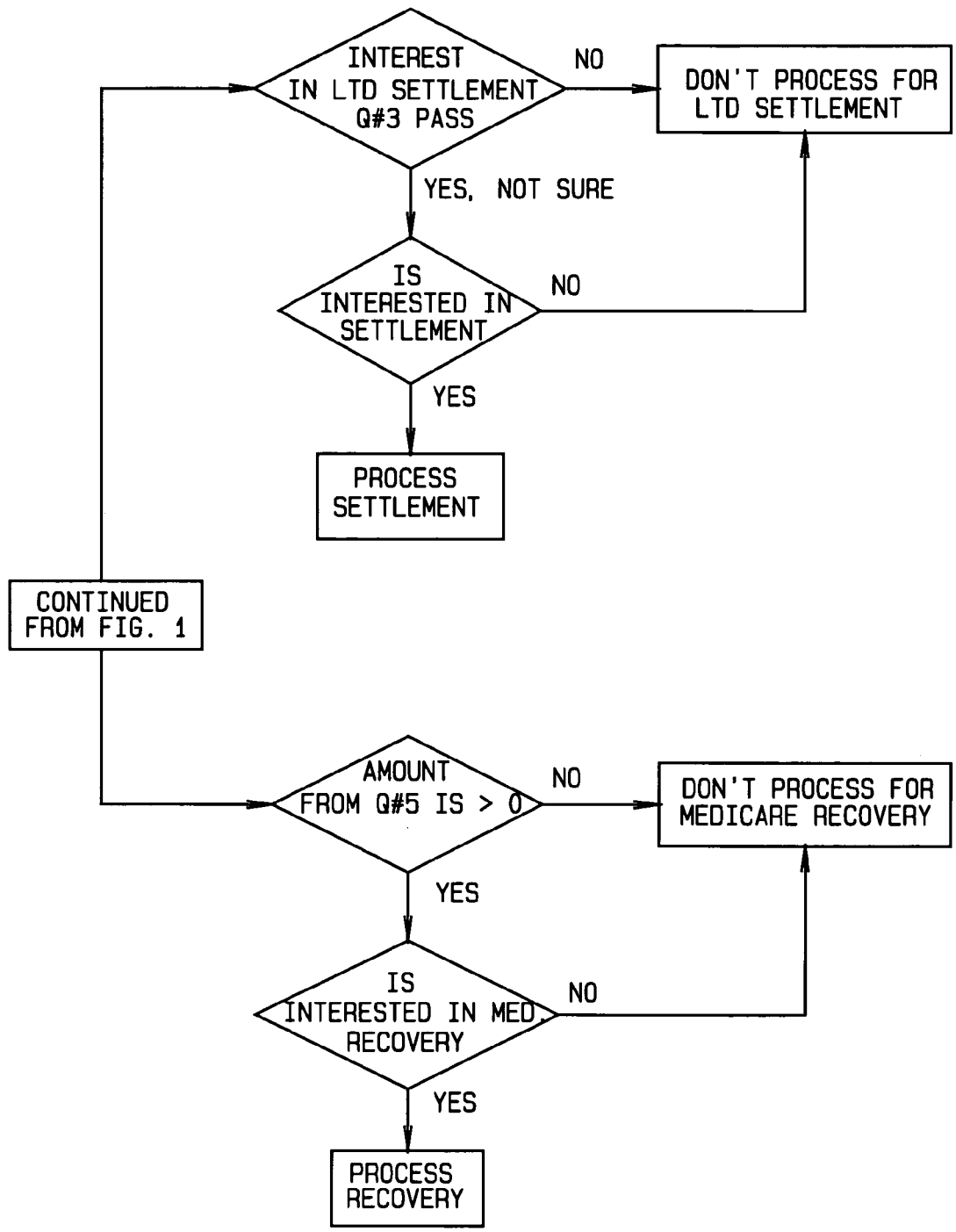
FIG. 13 is a block diagram illustrating the workflow employed in the post award services and savings method of the present invention.

In any event, if The Service Provider is allowed to sell PASS 104, claimant is sent information only 106. A follow-up call then is made 108. If the claimant refuses PASS, the process ends 110. If the claimant purchases PASS, the afore listed PASS Program Additional Interview Questions is completed 112. FIGS. 13-15 indicate the timing and sequence of specific questions from the PASS Program Additional Interview Questions.

It will be appreciated that once a claimant receives a lump-sum settlement or structured disability settlement, the claimant may be in need of various post-award services which allow the claimant to preserve the settlement. Therefore, the novel PASS program of the present invention meets the need of a significant number of disabled individuals.

Financial Assistance Program for Claimants (FAP)

The present invention contemplates a novel program of extending funds to uninsured disabled individuals (claimants) during the period such claimants' applications for SSDI and other benefits are being processed. The extension of funds to the disabled individual may be provided by The Service Provider or a subsidiary or by a financial institution through an arrangement established by The Service Provider with such financial institution. On a monthly basis, those claimants who qualify for the Financial Assistance Program (FAP) will have credited to their checking or savings account or, in the alternative, by way of an increase in the amount of funds available under the individual's FAP account, a set amount of funds. The monthly amount to be credited to the individual will be determined at the time the individual qualifies for and enrolls in the FAP. The funds can be used by the individual for any purpose. Depending on the means to be utilized to implement the FAP, interest may be charged on those amounts provided to the disabled individual.

To the extent interest is charged on such funds, The Service Provider will structure the interest rate to be at a legally permissible rate below the standard rate a theoretical third-party lender would otherwise charge in a particular market under similar circumstances. To the extent required, The Service Provider or the financial institution will comply with all applicable laws, rules and regulations regarding licensing, disclosures and similar matters. In general, the claimant will not be required to return the amount of funds provided if a retroactive award of Social Security benefits is not obtained through The Service Provider. However, if a retroactive award is obtained, the claimant is required to refund the amount of funds made available to the claimant during the application process, together with any interest thereon, if applicable. The claimant is required to enroll and pay for services under the above described PASS program for a period of not less than three years. The repayment of the amount of funds advanced during the application process and to pay the enrollment fee for PASS services, is deducted by The Service Provider from the retroactive award utilizing the pre-authorized withdrawal element of The Service Provider's novel overpayment recovery service, described above.

The Financial Assistance Program available for disabled individuals provides a temporary means for the disabled individual to meet basic needs and assists in alleviating financial pressures on the individual during a time when he or she is physically and mentally challenged and his or her income is reduced. FAP provides a novel and valuable service to disabled individuals, consistent with the maintenance of human dignity and The Service Provider's role as a responsive and productive corporate citizen.

It will be appreciated by those skilled in the art that, although the three primary parts of the novel method of the instant invention have been described separately, these subparts can be integrated, as desired by The Service Provider, to provide any combination of desired products for a client or claimant. Furthermore, various modifications and changes can be made in the foregoing detailed description without departing from the scope of the invention. Therefore, the description and accompanying exhibits are intended to be illustrative only and should not be construed in a limiting sense.

The invention claimed is:

1. A method of obtaining Social Security disability insurance benefits (SSDI) from the Social Security Administration (SSA) for a disabled individual, recovering overpaid benefits made by a third party and providing services to the disabled individual after obtaining SSDI from the SSA comprising:

determining if the disabled individual qualifies to receive SSDI;

obtaining from the disabled individual by a service provider preauthorization for direct recovery of the overpaid benefits from a deposit account;

filing a claim with the SSA for SSDI on behalf of the disabled individual;

obtaining SSDI for the disabled individual as a result of the filing of the claim with the SSA, said SSDI being directly deposited by the SSA into the deposit account; and electronically recovering from the deposit account by use of a computer by the service provider a preauthorized, predetermined amount of overpaid benefits previously provided to the disabled person by the third party, after the deposit of SSDI by the SSA in the deposit account.

2. The method of claim 1 further comprising providing ancillary financial services to the disabled individual after determining if the disabled individual qualifies to receive SSDI, wherein the ancillary financial services include financial assistance by extending funds to the claimant for use by the claimant before there is an award of SSDI for the disabled individual.

3. A method of improving the rate of recovery and decreasing collection time from a claimant of an overpaid disability insurance benefit after an award of SSDI and the claimant's receipt of SSDI payments comprising obtaining authorization from the claimant for electronic capture of the overpaid disability insurance benefit by a service provider before the receipt of SSDI payments, establishing direct deposit of SSDI in a deposit account, and then electronically capturing from the deposit account by use of a computer by the service provider, a predetermined amount of long-term disability benefits previously provided to the disabled person by a third party, wherein the electronic capture is completed after a SSDI payment is directly, deposited in the deposit account but before it is removed from the deposit account by the disabled individual.

4. A data processing system for managing a disability insurance overpayment recovery service for recovery of an overpaid disability benefit from a disabled individual comprising:
  a computer processor for processing data; and
  computer software configured to perform data processing functions comprising:
  a). determining if the disabled individual qualifies to receive SSDI from the SSA;
  b). filing a claim with the SSA on behalf of the disabled individual;
  c). monitoring the progress of the claim for SSDI and receipt of an award of SSDI from the SSA;
  d). calculating an overpaid amount of long-term disability insurance benefits for which the disabled individual has authorized withdrawal by a service provider prior to receiving a SSDI award; and
  e). recovering from a deposit account approved by the SSA for direct deposit of SSDI benefits by the service provider the calculated overpaid amount of long-term disability benefits previously provided to the disabled person by a third party, after the award of SSDI by SSA and receipt of SSDI payments.

5. A method of obtaining SSDI for a claimant and recovering an overpayment of long-term disability benefits paid by a third party comprising:
  determining if the claimant qualifies for SSDI from the SSA;
  filing a claim for the claimant with the SSA to qualify for SSDI;
  determining if the claimant qualifies for a recovery of an overpayment of long-term disability benefits paid to the claimant by a third party;
  obtaining authorization from the claimant to recover by a service provider the overpayment of long-term disability benefits paid to the claimant by the third party;
  obtaining access to a deposit account approved by the SSA for direct payment of a SSDI benefit held by the claimant;
  establishing direct transfer of SSDI from the SSA to the deposit account;
  calculating an amount of overpayment of long-term disability benefits in the deposit account paid to the claimant by a third party based upon a disability benefit previously provided by the third party;
  determining a date of the direct transfer of SSDI from the SSA to the deposit account;
  accessing the deposit account held by the claimant;
  electronically recovering from the deposit account held by the claimant the calculated overpayment amount by use of a computer by the service provider; and
  returning the calculated overpayment amount to the third party.

6. The method of claim 5 further comprising deducting applicable fees from the calculated overpayment amount to the third party.

7. The method of claim 5 further comprising providing ancillary financial services to the claimant before obtaining direct transfer of SSDI from the SSA to the deposit account comprising the advancement of funds to the claimant for use by the claimant until the claimant obtains direct payment of SSDI.

8. A method of obtaining Social Security disability insurance benefits (SSDI) from the Social Security Administration (SSA) for a disabled individual, and recovering overpaid benefits made by a third party after obtaining SSDI from the SSA comprising:
  determining if the disabled individual qualifies to receive SSDI;
  obtaining preauthorization from the disabled individual to electronically recover funds from a deposit account by a service provider;
  filing a claim with the SSA for SSDI on behalf of the disabled individual;
  establishing direct deposit of SSDI by SSA into the deposit account;
  obtaining an award of SSDI for the disabled individual as a result of the filing of the claim with the SSA; and
  electronically recovering from the deposit account by use of a computer by the service provider a predetermined amount of long-term disability benefits previously provided to the disabled person by a third party, after the award of SSDI by SSA and the disabled individual's receipt of SSDI payments.

9. The method of claim 8 comprising a step of obtaining from the disabled individual preauthorization for electronic recovery of a predetermined amount of long-term disability, benefits from a deposit account prior to obtaining an award of SSDI.

10. The method of claim 8 further comprising the step of obtaining a date of deposit of a SSDI benefit to the deposit account by the SSA after filing a claim with the SSA for SSDI.

* * * * *